US010187571B2

United States Patent
Shimmoto

(10) Patent No.: US 10,187,571 B2
(45) Date of Patent: Jan. 22, 2019

(54) IMAGE MANAGEMENT APPARATUS, IMAGE COMMUNICATION SYSTEM, METHOD FOR CONTROLLING DISPLAY OF CAPTURED IMAGE, AND NON-TRANSITORY COMPUTER-READABLE MEDIUM

(71) Applicant: Takafumi Shimmoto, Kanagawa (JP)

(72) Inventor: Takafumi Shimmoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 15/404,616

(22) Filed: Jan. 12, 2017

(65) Prior Publication Data
US 2017/0223268 A1    Aug. 3, 2017

(30) Foreign Application Priority Data
Jan. 29, 2016    (JP) .................................. 2016-016162

(51) Int. Cl.
| H04N 5/232 | (2006.01) |
|---|---|
| H04N 1/00 | (2006.01) |
| H04N 1/21 | (2006.01) |
| H04N 1/32 | (2006.01) |

(52) U.S. Cl.
CPC ..... *H04N 5/23238* (2013.01); *H04N 1/00129* (2013.01); *H04N 1/00222* (2013.01); *H04N 1/2112* (2013.01); *H04N 1/32101* (2013.01); *H04N 5/23206* (2013.01); *H04N 5/23293* (2013.01); *H04N 2201/0084* (2013.01)

(58) Field of Classification Search
None
See application file for complete search history.

(56) References Cited

U.S. PATENT DOCUMENTS

| 9,031,382 | B1 * | 5/2015 | Kaiser .................... | G11B 27/00 386/248 |
| 2009/0164567 | A1 * | 6/2009 | Hara ...................... | G06F 3/0482 709/203 |

(Continued)

FOREIGN PATENT DOCUMENTS

JP    2014-006880    1/2014

*Primary Examiner* — Eileen M Adams
(74) *Attorney, Agent, or Firm* — Oblon, McClelland, Maier & Neustadt, L.L.P.

(57) ABSTRACT

An image management apparatus includes a memory, circuitry and a transmitter. The circuitry is configured to: generate a thumbnail image from each of captured images; store, in the memory, for each of the thumbnail images, thumbnail identification information for identifying the thumbnail image in association with related information relating to the captured image, the related information indicating one or more attributes of the captured image; transmit one or more thumbnail images of the thumbnail images stored in the memory to a communication terminal; and receive, from the communication terminal, a change request that requests to change a display of the screen to include a specific one or more thumbnail images each being associated with a specific attribute of the related information. The transmitter transmits the specific thumbnail images each identified by specific thumbnail identification information associated with the specific attribute of the related information.

13 Claims, 39 Drawing Sheets

(56) References Cited

U.S. PATENT DOCUMENTS

2010/0026842 A1* 2/2010 Ishizaka ............ G06F 17/30265
348/231.2
2013/0326419 A1   12/2013 Harada et al.
2014/0184821 A1*  7/2014 Taneichi ................ H04N 5/765
348/207.1

* cited by examiner

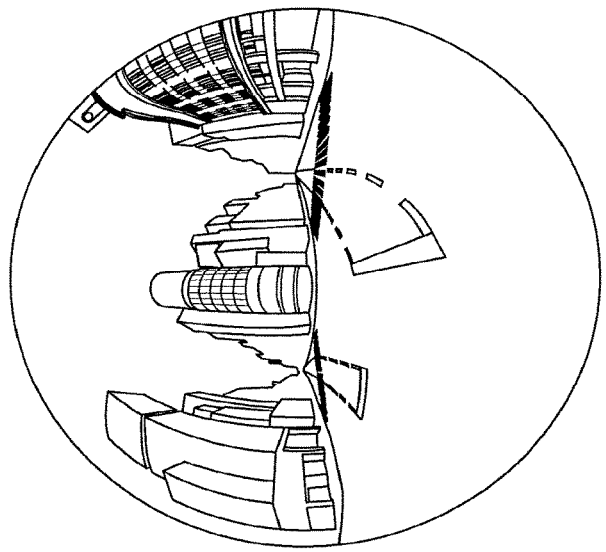
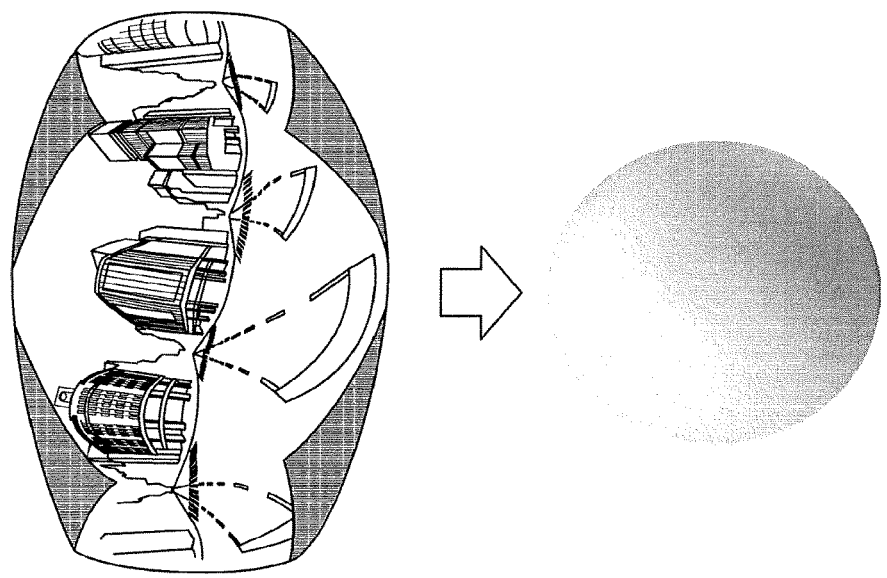

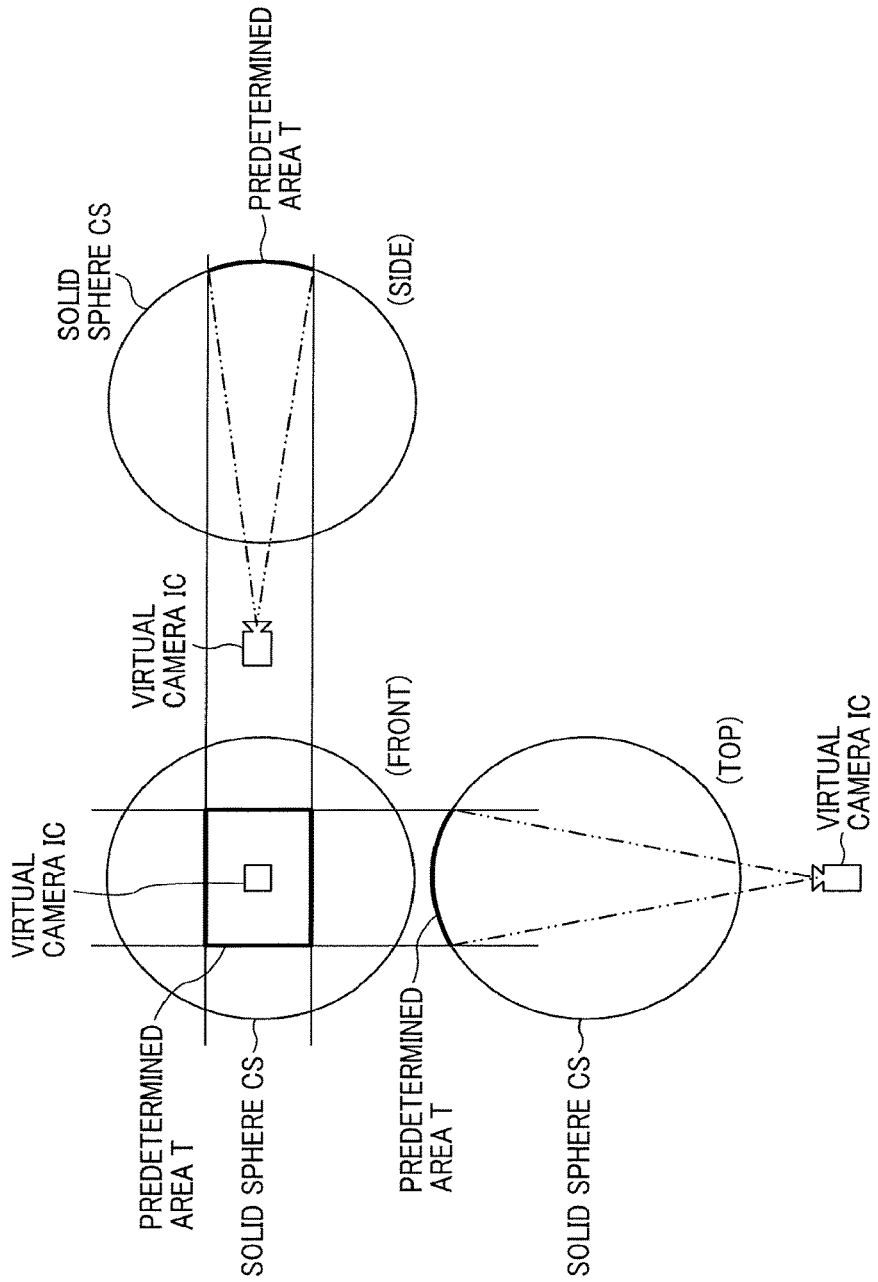

FIG. 14

LOCATION MANAGEMENT TABLE

| AREA ID | AREA NAME | SITE ID | LOCATION NAME | FILE NAME OF LAYOUT MAP | DEVICE ID |
|---|---|---|---|---|---|
| a001 | TOKYO | s001 | SHIBUYA STORE | 100008ifauy.jpg | t0001, t0002, t0003, t0004, t0005, t0006 |
| a001 | TOKYO | s002 | YURAKUCHO VENUE | 100009ifauy.jpg | t0021, t00022, t0023, t0024 |
| ... | ... | ... | ... | ... | ... |

FIG. 15

TERMINAL MANAGEMENT TABLE

| DEVICE ID | DEVICE INSTALLATION POSITION | PREDETERMINED AREA INFORMATION (SPECIFIC-AREA INFORMATION) [COORDINATE x (rH), COORDINATE y (rV), ANGLE OF VIEW (angle)] |
|---|---|---|
| t0001 | (3, 6) | rH234, rV450, angle32 |
| t0002 | (3, 9) | rH134, rV350, angle35 |
| ... | ... | ... |

FIG. 16

IMAGE CAPTURING MANAGEMENT TABLE

| LOCATION ID | CAPTURING TITLE | CAPTURING START DATE | CAPTURING END DATE |
|---|---|---|---|
| s001 | WEEKEND SALE | 2015.7.5.10:00 | 2015.7.5.18:00 |
| s002 | SALE AFTER INVENTORY | 2015.7.6.13:00 | 2015.7.6.20:00 |
| ... | ... | ... | ... |

FIG. 17

IMAGE MANAGEMENT TABLE

| DEVICE ID | CAPTURED IMAGE ID | FILE NAME OF CAPTURED IMAGE DATA | CAPTURING DATE |
|---|---|---|---|
| t0001 | au123456ifauy | au123456ifauy.jpg | 2015.7.5.10:00 |
| t0001 | au123457ifauy | au123467ifauy.jpg | 2015.7.5.10:10 |
| ... | ... | ... | ... |

FIG. 18
THUMBNAIL MANAGEMENT TABLE
| THUMB-NAIL ID | FILE NAME OF THUMB-NAIL DATA | CAPTURED IMAGE ID | CAPTURING DATE | NUMBER OF DETECTED PERSON IMAGES | RELATED INFORMATION | | | |
|---|---|---|---|---|---|---|---|---|
| | | | | | PER-SON ID | POSITION AND AREA OF PERSON | NUMBER OF DRAWN-IMAGES | DRAW-ING ID | POSITION AND AREA OF DRAWN-IMAGE |
| th123456 | au123456ifauy.thum.jpg | au123456ifauy | 2016.7.5.12:03 | 2 | h0011 | (x11,y11,z11,,w11,h11) | 1 | d0001 | (x21,y21,z21,,w21,h21) |
| | | | | | h0012 | (x12,y12,z12,,w12,h12) | | | |
...
FIG. 19A
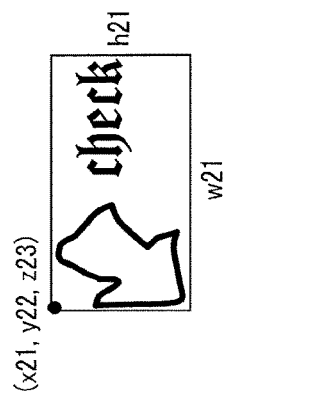
(x11, y12, z13)
FIG. 19B
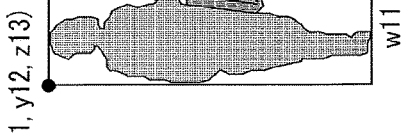
(x21, y22, z23)

DRAWN-IMAGE MANAGEMENT TABLE

| CAPTURED IMAGE ID | DRAWING ID | FILE NAME OF DRAWN-IMAGE DATA | POSITION OF DRAWN-IMAGE | AREA OF DRAWN-IMAGE | REFERENCE POSITION |
|---|---|---|---|---|---|
| au012345ifauy | d0001 | Image0101.jpg | (x21, y21, z21) | (w21, h21) | (x01, y01, z01) |
| ... | ... | ... | ... | ... | ... |

[Reservation scheduling interface showing SHIBUYA STORE week view Jul 5-11, 2015 with a "RESERVATION FOR IMAGE CAPTURING" dialog box containing CAPTURING TITLE, CAPTURING START TIME (10:00), CAPTURING END TIME (18:00), and Debug/OK/Cancel buttons. Labels: 7290, 7310, 7380.]

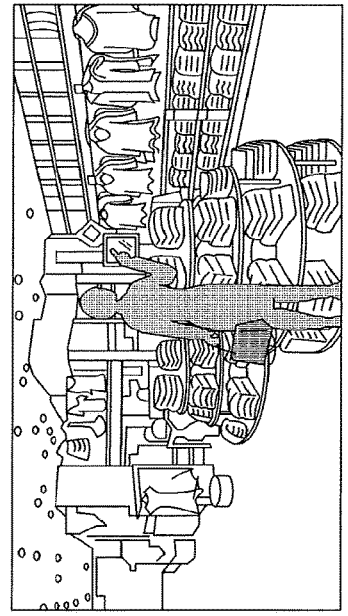
FIG. 30B
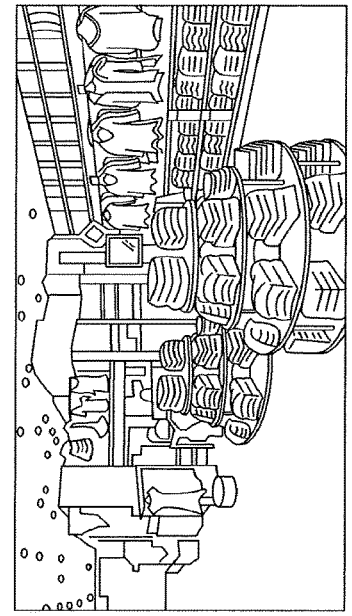
FIG. 30D
FIG. 30A
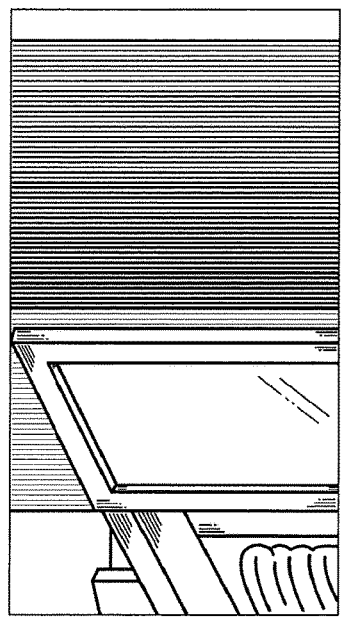
FIG. 30C
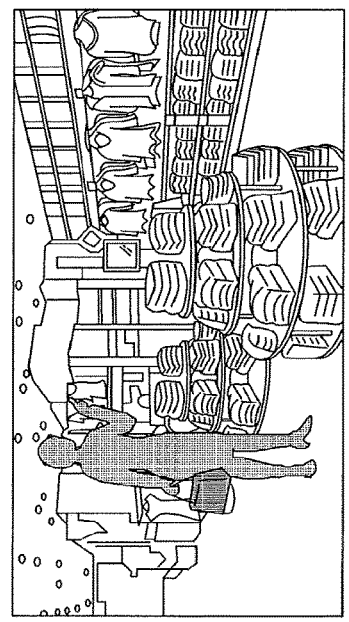

IMAGE MANAGEMENT APPARATUS, IMAGE COMMUNICATION SYSTEM, METHOD FOR CONTROLLING DISPLAY OF CAPTURED IMAGE, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application No. 2016-016162, filed on Jan. 29, 2016 in the Japan Patent Office, the entire disclosure of which is hereby incorporated by reference herein.

BACKGROUND

Technical Field

The present disclosure relates to an image management apparatus, an image communication system, a method for controlling display of captured images, and a non-transitory computer-readable medium.

Description of the Related Art

Some recent digital cameras allow a user to capture a 360-degree full spherical panoramic image surrounding the user.

The full spherical panoramic image taken by the 360-degree full spherical camera is sometimes not suitable for viewing because the image looks curved. To address this issue, an image of a predetermined area, which is a part of the full spherical panoramic image, is displayed on smartphones and the like, allowing the user to view a planar image in a similar way to viewing an image taken by typical digital cameras.

Further, the 360-degree full spherical camera may be placed at a certain shop and the like to capture a full spherical panoramic image surrounding the user. Data of the captured image is sent to a server, etc., enabling a user at a remote location using a communication terminal to acquire the captured-image data from the server to view and monitor the states of the shop.

However, in a case in which the camera constantly captures images for a long time period, the user may have difficulty in finding out captured-image data on which the user focus attention.

SUMMARY

An image management apparatus for controlling a display of a captured image includes a memory, circuitry, and a transmitter. The memory stores a plurality of captured images each of which is captured with an image capturing device. The circuitry generates a thumbnail image from each of the plurality of captured images. The circuitry stores, in the memory, for each of the thumbnail images, thumbnail identification information for identifying the thumbnail image in association with related information relating to the captured image, the related information indicating one or more attributes of the captured image. The circuitry transmits one or more thumbnail images of the thumbnail images stored in the memory to a communication terminal to control the communication terminal to display a screen including the one or more thumbnail images. The circuitry receives, from the communication terminal, a change request that requests to change a display of the screen to include a specific one or more thumbnail images each being associated with a specific attribute of the related information. The transmitter transmits the specific thumbnail images each identified by specific thumbnail identification information associated with, in the memory, the specific attribute of the related information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4A is an illustration for explaining how the image represented by Mercator projection covers a surface of a sphere according to an embodiment of the present invention;

FIG. 4B is a view illustrating a full spherical panoramic image according to an embodiment of the present invention;

FIG. 5 is a view illustrating positions of a virtual camera and a predetermined area in a case in which the full spherical panoramic image is represented as a three-dimensional solid sphere;

FIG. 14 is an example of a location management table according to an embodiment of the present invention;

FIG. 15 is an example of a terminal management table according to an embodiment of the present invention;

FIG. 16 is an example of an image capturing management table according to an embodiment of the present invention;

FIG. 17 is an example of an image management table according to an embodiment of the present invention;

FIG. 18 is an example of a thumbnail management table according to an embodiment of the present invention;

FIG. 19A is an illustration for explaining a position and area of a person image according to an embodiment of the present invention;

FIG. 19B is an illustration for explaining a position and area of a drawn image according to an embodiment of the present invention;

FIGS. 27A and 27B are views, each illustrating an example of a schedule screen according to an embodiment of the present invention;

FIGS. 28A and 28B are views, each illustrating an example of a schedule screen according to an embodiment of the present invention;

FIGS. 30A to 30D are views, each illustrating an example of a predetermined-area image in a specific location according to an embodiment of the present invention;

Figure 1C:
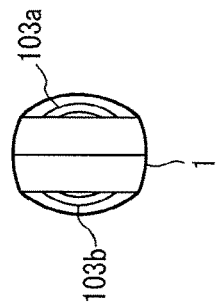
FIG. 1C is a plan view of the image capturing device of FIG. 1A.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Several exemplary embodiments of the present invention are described hereinafter with reference to drawings.

Hereinafter, a description is given hereinafter of generation of a full spherical panoramic image with reference to FIGS. 1 to 7.

Figure 1B:
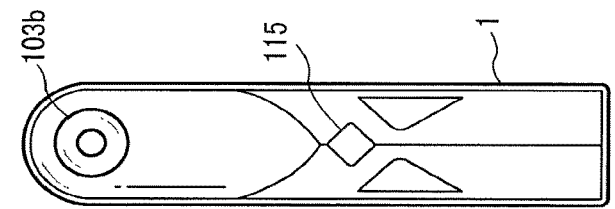
FIG. 1B is a front view of the image capturing device of FIG. 1A.
Figure 1A:
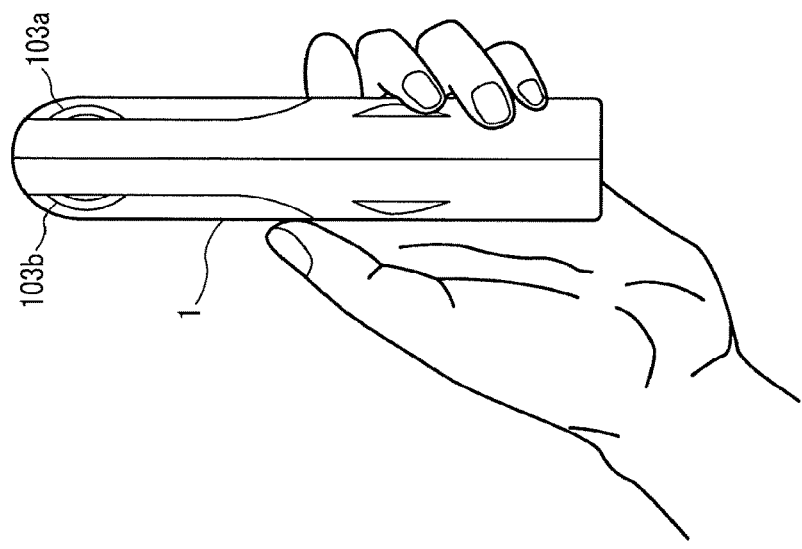
FIG. 1A is a left side view of an image capturing device according to an embodiment of the present invention.

First, a description is given of an external view of an image capturing device 1 with reference to FIGS. 1A to 1C. The image capturing device 1 is a digital camera for acquiring captured images from which a 360-degree full spherical panoramic image is generated. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A to 1C, an imaging element 103a is provided on a front side (anterior side) of an upper section of the image capturing device 1, and an imaging element 103b is provided on a back side (rear side) thereof. Furthermore, as illustrated in FIG. 1B, an operation unit 115 such as a shutter button is provided on the back side (rear side) of the image capturing device 1.

Figure 2:
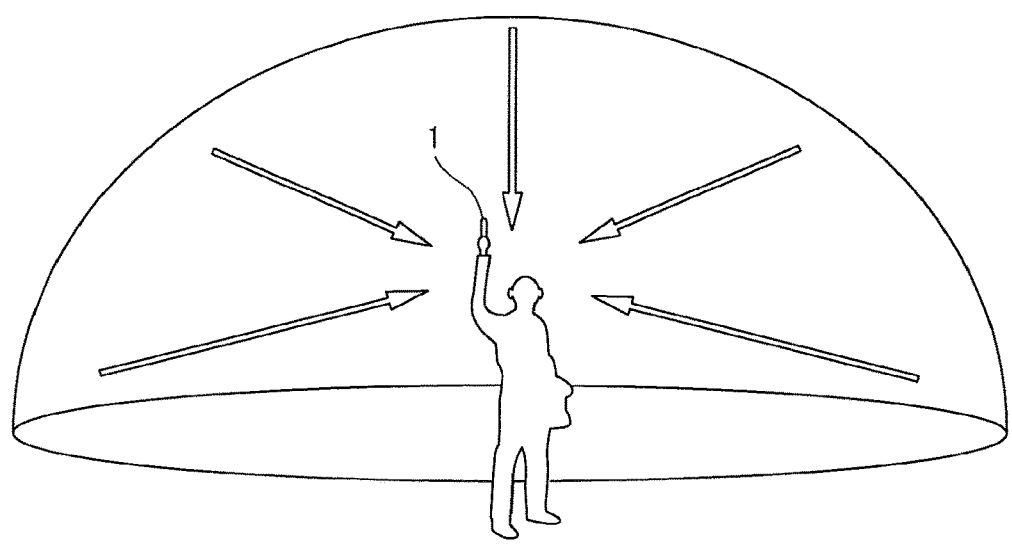
FIG. 2 is an illustration for explaining how a user uses the image capturing device of FIG. 1A to 1C (FIG. 1) according to an embodiment of the present invention.

Hereinafter, a description is given of a situation where the image capturing device 1 is used with reference to FIG. 2. FIG. 2 is an example illustration for explaining how a user uses the image capturing device 1. As illustrated in FIG. 2, for example, the image capturing device 1 is used for capturing objects surrounding the user who is holding the image capturing device 1 in his/her hand. The imaging elements 103a and 103b illustrated in FIGS. 1A to 1C capture the objects surrounding the user to obtain two hemispherical images.

Figure 3A:
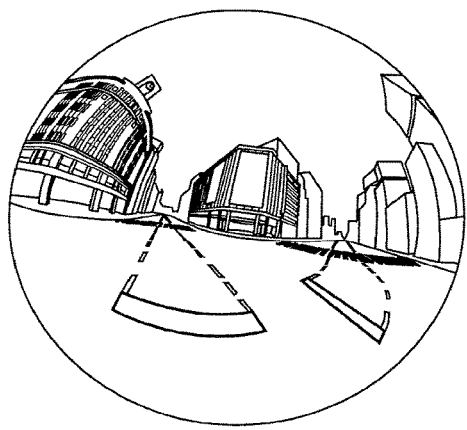
FIG. 3A is a view illustrating a front side of a hemispherical image captured by the image capturing device of FIG. 1 according to an embodiment of the present invention.
Figure 3B:
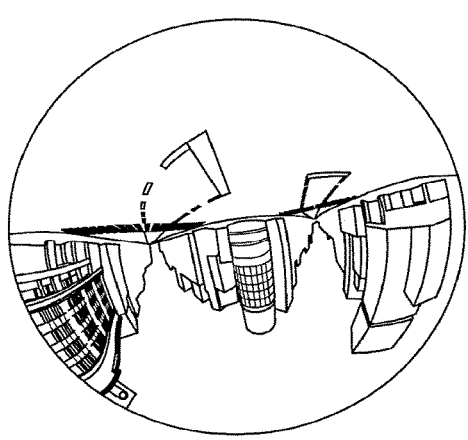
FIG. 3B is a view illustrating a back side of the hemispherical image captured by the image capturing device of FIG. 1 according to an embodiment of the present invention.
Figure 3C:
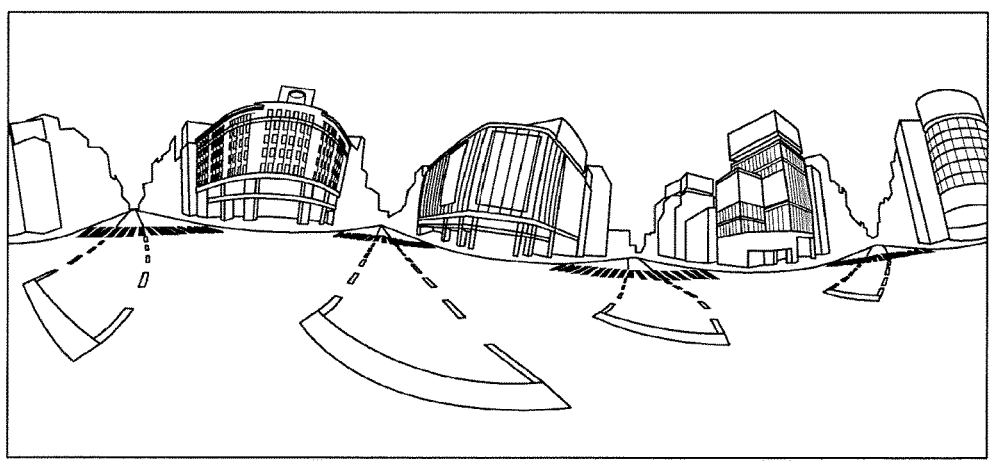
FIG. 3C is a view illustrating an image captured by the image capturing device of FIG. 1, represented by Mercator projection according to an embodiment of the present invention.

Hereinafter, a description is given of an overview of an operation of generating the full spherical panoramic image from the image captured by the image capturing device 1. FIG. 3A is a view illustrating a front side of a hemispherical image captured by the image capturing device 1. FIG. 3B is a view illustrating a back side of the hemispherical image captured by the image capturing device 1. FIG. 3C is a view illustrating an image represented by Mercator projection. The image represented by Mercator projection as illustrated in FIG. 3C is referred to as a "Mercator image" hereinafter. FIG. 4A is an illustration of how the Mercator image covers a surface of a sphere. FIG. 4B is a view illustrating the full spherical panoramic image.

Figure 9:
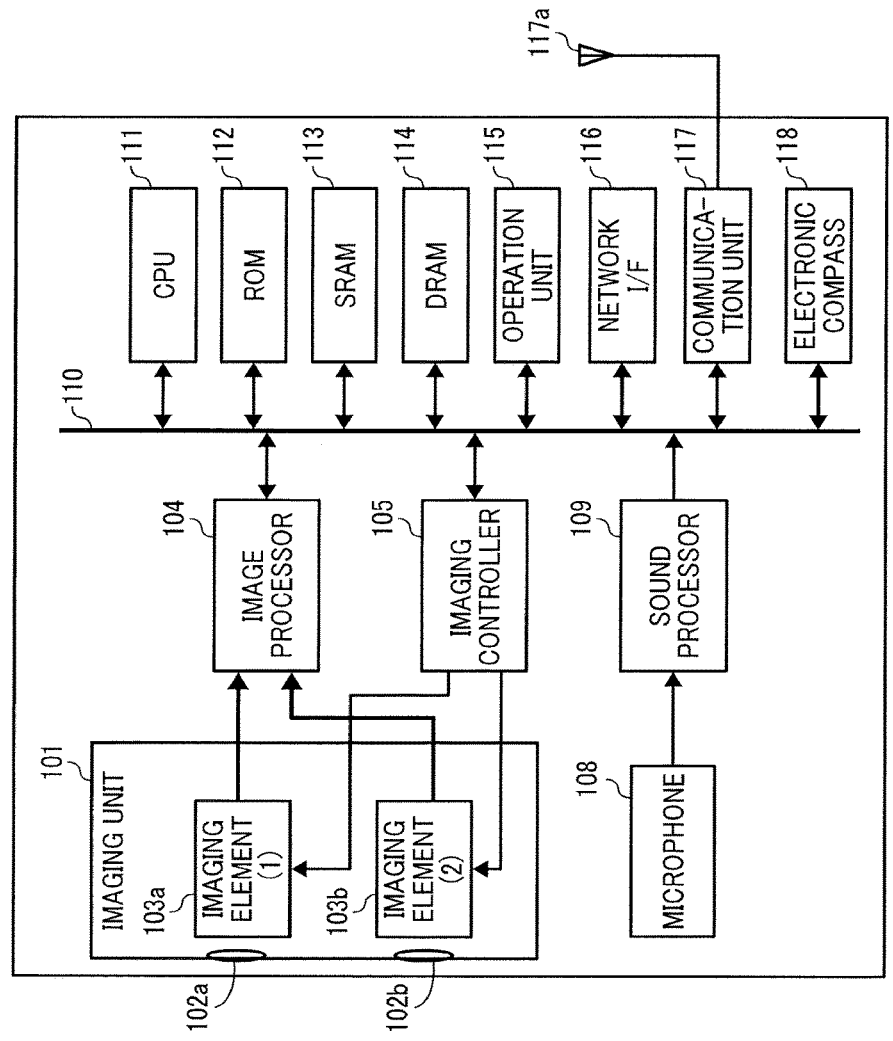
FIG. 9 is a block diagram illustrating a hardware configuration of the image capturing device of FIG. 1 according to an embodiment of the present invention.

As illustrated in FIG. 3A, an image captured by the imaging element 103a is a curved hemispherical image (front side) taken through a fisheye lens 102a (FIG. 9). Also, as illustrated in FIG. 3B, an image captured by the imaging element 103b is a curved hemispherical image (back side) taken through a fisheye lens 102b (FIG. 9). The hemispherical image (front side) and the hemispherical image (back side), which is reversed by 180-degree from each other, is combined. Thus, the Mercator image as illustrated in FIG. 3C is generated.

As illustrated in FIG. 4A, the Mercator image is attached to a sphere surface in such a manner that the sphere surface is covered with the Mercator image using Open Graphics Library for Embedded Systems (OpenGL ES). Thus, the full spherical panoramic image as illustrated in FIG. 4B is generated. In other words, the full spherical panoramic image is represented as the Mercator image facing toward a center of the sphere. It should be noted that OpenGL ES is a graphic library used for visualizing two-dimensional (2D) and three-dimensional (3D) data. The full spherical panoramic image is either a still image or a movie.

One may feel strange viewing the full spherical panoramic image, because the full spherical panoramic image is an image attached to the sphere surface. To resolve this strange feeling, an image of a predetermined area, which is a part of the full spherical panoramic image, is displayed as a planar image having less curves. The image of the predetermined area is referred to as a "predetermined-area image" hereinafter. Hereinafter, a description is given of displaying the predetermined-area image with reference to FIG. 5 and FIGS. 6A and 6B.

Figure 6A:
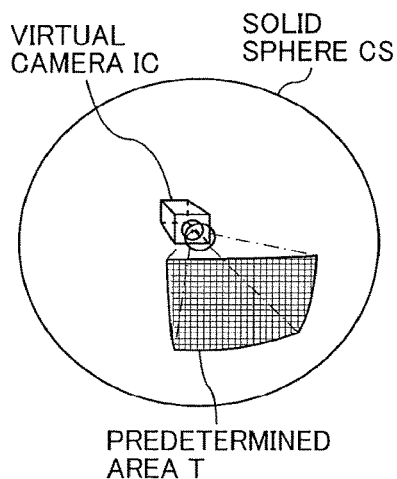
FIG. 6A is a perspective view of FIG. 5.
Figure 6B:
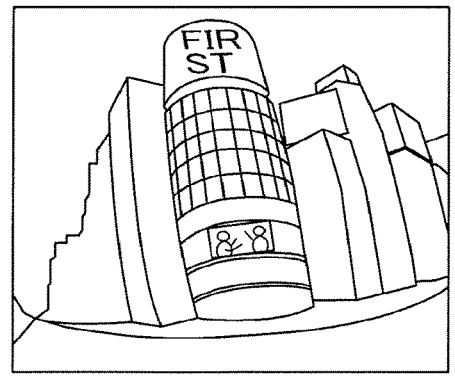
FIG. 6B is a view illustrating an image of the predetermined area on a display of a communication terminal according to an embodiment of the present invention.

FIG. 5 is a view illustrating positions of a virtual camera IC and a predetermined area T in a case in which the full spherical panoramic image is represented as a three-dimensional solid sphere. The virtual camera IC corresponds to a position of a point of view of a user who is viewing the full spherical panoramic image represented as the three-dimensional solid sphere. FIG. 6A is a perspective view of FIG. 5. FIG. 6B is a view illustrating the predetermined-area image displayed on a display. In FIG. 6A, the full spherical panoramic image illustrated in FIG. 4B is illustrated as a three-dimensional solid sphere CS. Assuming that the generated full spherical panoramic image is the solid sphere CS, the virtual camera IC is outside of the full spherical panoramic image as illustrated in FIG. 5. The predetermined area T in the full spherical panoramic image is specified by predetermined-area information of the position of the virtual camera IC in the full spherical panoramic image. This predetermined-area information is represented by, for example, a coordinate (x (rH), y (rV), and angle of view α (angle)) or a coordinate (X, Y, Z). Zooming of the predetermined area T is implemented by enlarging or reducing a range of the angle of view α. In other words, zooming of the predetermined area T is implemented by enlarging or reducing an arc. Further, zooming of the predetermined area T is implemented by moving the virtual camera IC toward or away from the full spherical panoramic image.

An image of the predetermined area T in the full spherical panoramic image, illustrated in FIG. 6A, is displayed on a display as the predetermined-area image, as illustrated in FIG. 6B. FIG. 6B illustrates an image represented by the predetermined-area information (x, y, α), which is set by default.

Figure 7:
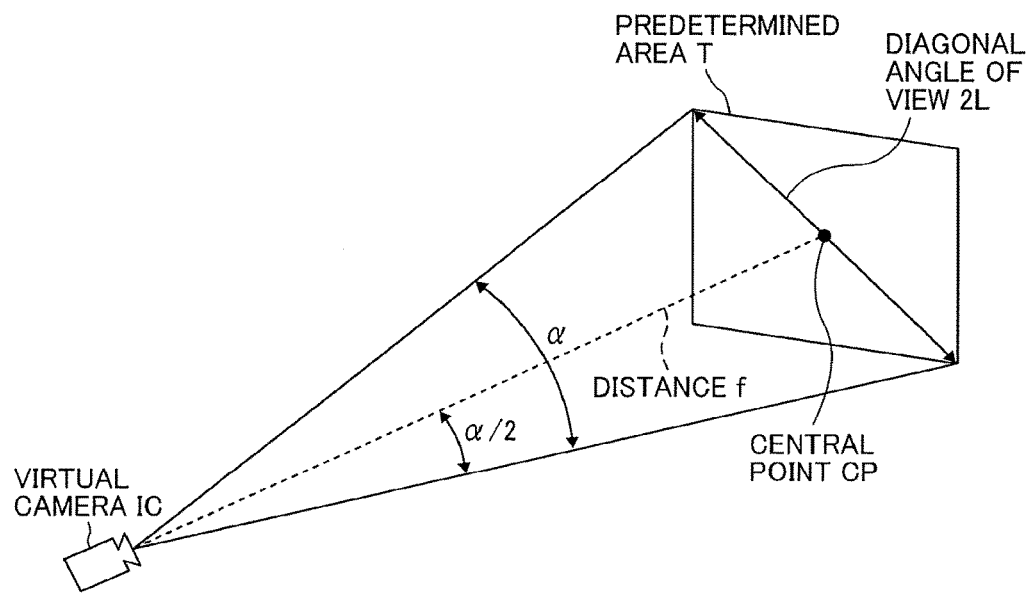
FIG. 7 is a view illustrating a relation between predetermined-area information and a predetermined-area image.

Hereinafter, a description is given of a relation between the predetermined-area information and the predetermined-area image with reference to FIG. 7. As illustrated in FIG. 7, a center point CP of 2 L provides the parameters (x, y) of the predetermined-area information, where 2 L denotes a diagonal angle of view of the predetermined area T. Distance f denotes a distance from the virtual camera IC to the central point CP. In FIG. 7, a trigonometric function equation generally expressed by the following equation is satisfied.

$$Lf = \tan(\alpha/2)$$

Hereinafter, a description is given of an overview of a configuration of an image communication system according to this embodiment with reference to FIG. 8.

Figure 8:
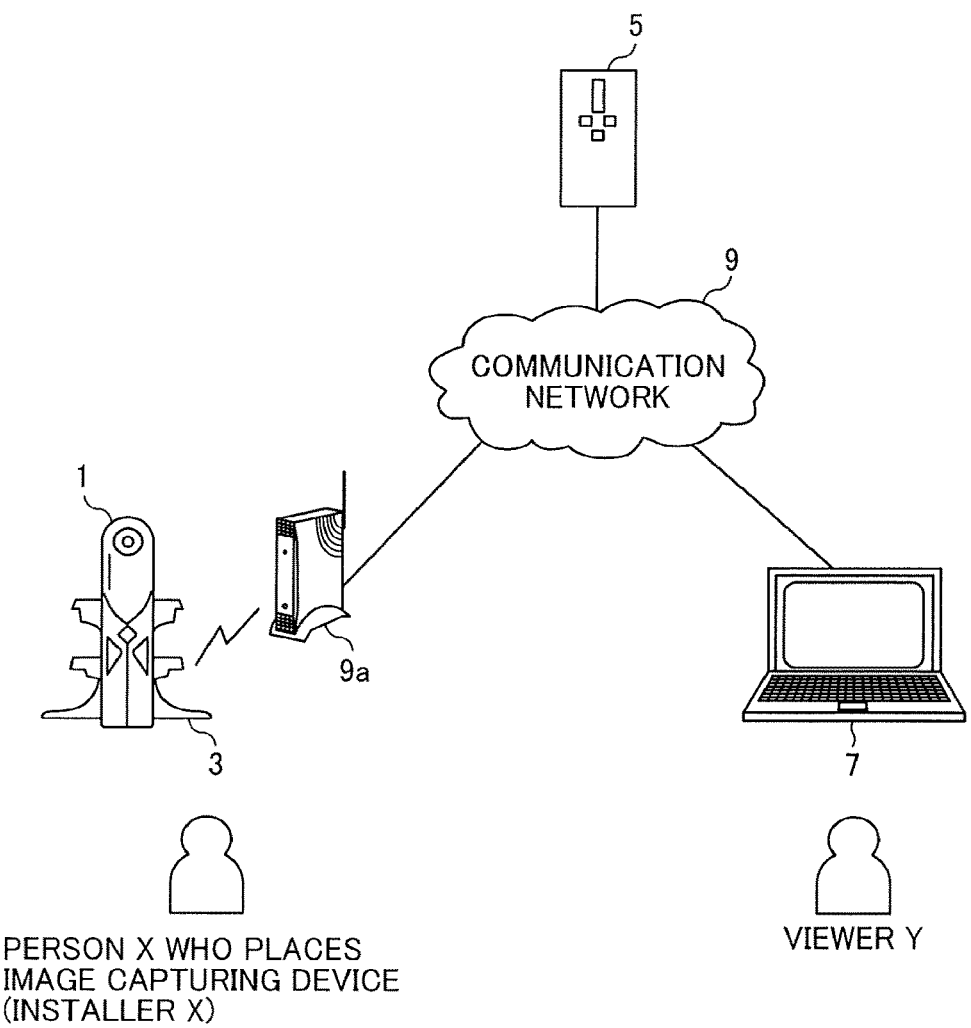
FIG. 8 is a schematic diagram illustrating a configuration of an image communication system including an image management system, a first communication terminal, and a second communication terminal according to an embodiment of the present invention.

As illustrated in FIG. 8, the image communication system includes the image capturing device 1, a communication terminal 3, a wireless router 9a, an image management system 5, and a communication terminal 7.

As described above, the image capturing device 1 is a digital camera capable of obtaining the full spherical panoramic image. Alternatively, the image capturing device 1 may be a typical digital camera. In a case in which the communication terminal 3 includes a camera, the communication terminal 3 may also operate as the digital camera. In this embodiment, a description is given of a case in which the image capturing device 1 is a digital camera that is capable of obtaining the full spherical panoramic image, in order to make the description simple. In this example, the communication terminal 3 operates at least as a docking station that charges the image capturing device 1 or exchanges data with the image capturing device 1. The communication terminal 3 communicates data with the image capturing device 1 via a contact. In addition, the communication terminal 3 communicates data with the image management system 5 via the wireless router 9a and a communication network 9. The communication network 9 is implemented by, for example, the Internet.

The image management system 5 communicates data with the communication terminal 3 and the communication terminal 7 via the communication network 9. The image management system 5 is implemented by, for example, a server computer. The image management system 5 is installed with OpenGL ES to generate the full spherical panoramic image. Further, the image management system 5 generates thumbnail data of an image of a part of the full spherical panoramic image (the predetermined-area image or a specific-area image, which is described below) to provide the communication terminal 7 with thumbnail data and captured image data.

The communication terminal 7 communicates data with the image management system 5 via the communication network 9. The communication terminal 7 is implemented by, for example, a laptop computer. It should be noted that the image management system 5 may be implemented by either a single server computer or a plurality of server computers.

The image capturing device 1, the communication terminal 3, and the wireless router 9*a* are each placed at a desired position in a sales location such as a clothing retailer by an installer X. The communication terminal 3 could be more than one, each placed in each sales location. The communication terminal 7 is in, for example, a main office to allow one to remotely manage and monitor different sales locations. The communication terminal 7 displays an image transmitted via the image management system 5 to allow a viewer Y view an image representing a status of each location. The image representing the status of each location is hereinafter referred to as a "location status image". The image management system 5 is at, for example, a service enterprise that provides services such as generating thumbnail data based on the captured-image data transmitted from the communication terminal 3 at each sales location, and providing the communication terminal 7 with the thumbnail data or the captured image data.

Hereinafter, a description is given of hardware configurations of the image capturing device 1, the communication terminal 3, the communication terminal 7, and the image management system 5 according to this embodiment with reference to FIGS. 9 to 11.

First, a description is given of a hardware configuration of the image capturing device 1 with reference to FIG. 9. Although a description is given of a case in which the image capturing device 1 is an omnidirectional image capturing device having two imaging elements, the image capturing device 1 may include three or more imaging elements. In addition, the image capturing device 1 is not necessarily an image capturing device dedicated to omnidirectional image capturing. Alternatively, an external omnidirectional image capturing unit may be attached to a general digital camera or smartphone to implement an image capturing device having a substantially same function as that of the image capturing device 1.

As illustrated in FIG. 9, the image capturing device 1 includes an imaging unit 101, an image processor 104, an imaging controller 105, a microphone 108, a sound processor 109, a central processing unit (CPU) 111, a read only memory (ROM) 112, a static random access memory (SRAM) 113, a dynamic random access memory (DRAM) 114, an operation unit 115, a network interface (I/F) 116, a communication unit 117, an antenna 117*a*, and an electronic compass 118.

The imaging unit 101 includes two wide-angle lenses (so-called fish-eye lenses) 102*a* and 102*b*, each having an angle of view of equal to or greater than 180 degrees so as to form a hemispheric image. The imaging unit 101 further includes the two imaging elements 103*a* and 103*b* corresponding to the wide-angle lenses 102*a* and 102*b* respectively. The imaging elements 103*a* and 103*b* each includes an image sensor such as a complementary metal oxide semiconductor (CMOS) sensor and a charge-coupled device (CCD) sensor, a timing generation circuit, and a group of registers. The image sensor converts an optical image formed by the wide-angle lenses 102*a* and 102*b* into electric signals to output image data. The timing generation circuit generates horizontal or vertical synchronization signals, pixel clocks and the like for the image sensor. Various commands, parameters and the like for operations of the imaging elements 103*a* and 103*b* are set in the group of registers.

Each of the imaging elements 103*a* and 103*b* of the imaging unit 101 is connected to the image processor 104 via a parallel I/F bus. In addition, each of the imaging elements 103*a* and 103*b* of the imaging unit 101 is connected to the imaging controller 105 via a serial I/F bus such as an I2C bus. The image processor 104 and the imaging controller 105 are each connected to the CPU 111 via a bus 110. Furthermore, the ROM 112, the SRAM 113, the DRAM 114, the operation unit 115, the network I/F 116, the communication unit 117, and the electronic compass 118 are also connected to the bus 110.

The image processor 104 acquires the image data from each of the imaging elements 103*a* and 103*b* via the parallel I/F bus and performs predetermined processing on each image data. Thereafter, the image processor 104 combines these image data to generate data of the Mercator image as illustrated in FIG. 3C.

The imaging controller 105 usually functions as a master device while the imaging elements 103*a* and 103*b* each usually functions as a slave device. The imaging controller 105 sets commands and the like in the group of registers of the imaging elements 103*a* and 103*b* via the I2C bus. The imaging controller 105 receives necessary commands and the like from the CPU 111. Further, the imaging controller 105 acquires status data and the like of the group of registers of the imaging elements 103*a* and 103*b* via the I2C bus. The imaging controller 105 sends the acquired status data and the like to the CPU 111.

The imaging controller 105 instructs the imaging elements 103*a* and 103*b* to output the image data at a time when the shutter button of the operation unit 115 is pressed. The image capturing device 1 may have a preview function or support displaying movie. In this case, the image data are continuously output from the imaging elements 103*a* and 103*b* at a predetermined frame rate (frames per minute).

Furthermore, the imaging controller 105 operates in cooperation with the CPU 111 to synchronize times when the imaging elements 103*a* and 103*b* output the image data. It should be noted that although the image capturing device 1 does not include a display in this embodiment, alternatively the image capturing device 1 may include the display.

The microphone 108 converts sounds to audio data (signal). The sound processor 109 acquires the audio data from the microphone 108 via an I/F bus and performs predetermined processing on the audio data.

The CPU 111 controls an entire operation of the image capturing device 1 and performs necessary processing. The ROM 112 stores various programs for the CPU 111. The SRAM 113 and the DRAM 114 each operates as a work memory to store the program loaded from the ROM 112 for execution by the CPU 111 or data in current processing. More specifically, the DRAM 114 stores the image data currently processed by the image processor 104 and the data of the Mercator image on which processing has been performed.

The operation unit 115 collectively refers to various operation keys, a power switch, the shutter button, and a touch panel having functions of both displaying information and receiving input from a user, which may be used in combination. The user operates the operation keys to input various photographing modes or photographing conditions.

The network I/F 116 collectively refers to an interface circuit such as an universal serial bus (USB) I/F that allows the image capturing device 1 to communicate data with an external media such as a SD card or an external personal computer. The network I/F 116 supports at least one of wired and wireless communications. The data of the Mercator image, which is stored in the DRAM 114, is stored in the external media via the network I/F 116 or transmitted to the external device such as the communication terminal 3 via the network I/F 116.

The communication unit 117 is implemented by, for example, an interface circuit. The communication unit 117 communicates data with an external device such as the communication terminal 3 via the antenna 117a by a near distance wireless communication such as Wi-Fi and Near Field Communication (NFC). The communication unit 117 is also capable of transmitting the data of Mercator image to the external device such as the communication terminal 3.

The electronic compass 118 calculates an orientation and a tilt (roll angle) of the image capturing device 1 from the Earth's magnetism to output orientation and tilt information. This orientation and tilt information is an example of related information, which is meta data described in compliance with Exif. This information is used for image processing such as image correction of the captured image. Further, the related information also includes a date and time when the image is captured by the image capturing device 1, and a size of the image data.

Hereinafter, a description is given of a hardware configuration of the communication terminal 3 with reference to FIG. 10. FIG. 10 is a block diagram illustrating a hardware configuration of the communication terminal 3, which in this embodiment is implemented by a docking station having a wireless communication capability.

Figure 10:
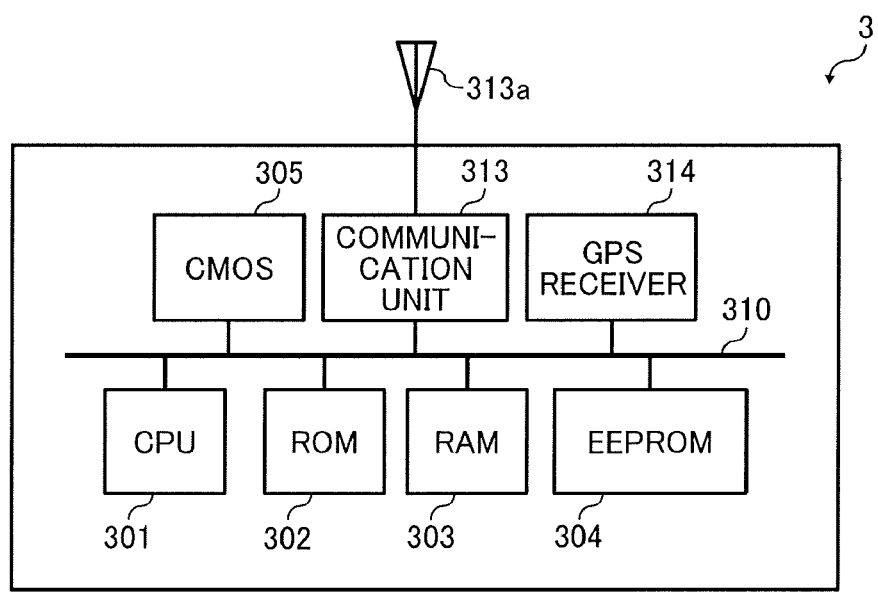
FIG. 10 is a block diagram illustrating a hardware configuration of the first communication terminal of FIG. 8 according to an embodiment of the present invention.

As illustrated in FIG. 10, the communication terminal 3 includes a CPU 301, a ROM 302, a RANI 303, an electrically erasable programmable ROM (EEPROM) 304, and a CMOS sensor 305. The CPU 301 controls entire operation of the communication terminal 3. The ROM 302 stores basic input/output programs. The CPU 301 uses the RAM 302 as a work area when executing programs or processing data. The EEPROM 304 performs data reading and writing under control of the CPU 301. The CMOS sensor 305 is an imaging element that captures an image of an object to obtain image data under control of the CPU 301.

The EEPROM 304 stores an operating system (OS), other programs, and various data for execution by the CPU 301. Instead of the CMOS sensor 305, a CCD sensor may be used.

Further, the communication terminal 3 includes an antenna 313a, a communication unit 313, a global positioning systems (GPS) receiver 314, and a bus line 310. The communication unit 313, which is implemented by, for example, an interface circuit, communicates data with other apparatuses or terminals by wireless communication signals using the antenna 313a. The GPS receiver 314 receives GPS signals containing position information of the communication terminal 3 with GPS satellites or an indoor Messaging system as indoor GPS. This position information of communication terminal 3 is represented by, for example, a latitude, longitude, and altitude. The bus line 310 electrically connects those parts or devices of the communication terminal 3 to each other. Examples of the bus line 310 include an address bus and a data bus.

Hereinafter, a description is given of hardware configurations of the image management system 5 and the communication terminal 7, which in this embodiment is implemented by a laptop computer, with reference to FIG. 11. FIG. 11 is a block diagram illustrating a hardware configuration of any one of the image management system 5 and the communication terminal 7. In this embodiment, both the image management system 5 and the communication terminal 7 are implemented by a computer. Therefore, a description is given of a configuration of the image management system 5, and the description of a configuration of the communication terminal 7 is omitted, having the same or substantially same configuration as that of the image management system 5.

The image management system 5 includes a CPU 501, a ROM 502, a RAM 503, an HD 504, a hard disc drive (HDD) 505, a media drive 507, a display 508, a network I/F 509, a keyboard 511, a mouse 512, a compact-disc read only memory (CD-ROM) drive 514, and a bus line 510. The CPU 501 controls entire operation of the image management system 5. The ROM 502 stores programs such as an initial program loader (IPL) to boot the CPU 501. The CPU 501 uses the RAM 503 as a work area when executing programs or processing data. The HD 504 stores various data such as programs for the image management system 5. The HDD 505 controls reading and writing of data from and to the HD 504 under control of the CPU 501. The media drive 507 controls reading and writing (storing) of data from and to a recording medium 506 such as a flash memory. The display 508 displays various information such as a cursor, menus, windows, characters, and images. The network I/F 509 communicates data with another apparatus such as the communication terminal 3 and the communication terminal 7 via the communication network 9. The keyboard 511 includes a plurality of keys to allow a user to input characters, numbers, and various instructions. The mouse 512 allows a user to input an instruction for selecting and executing various functions, selecting an item to be processed, or moving the cursor. The CD-ROM drive 514 controls reading and writing of data from and to a CD-ROM 513 as an example of a removable recording medium. The bus line 510 electrically connects those parts or devices of the image management system 5 to each other as illustrated in FIG. 11. Examples of the bus line 510 include an address bus and a data bus.

Figure 12:
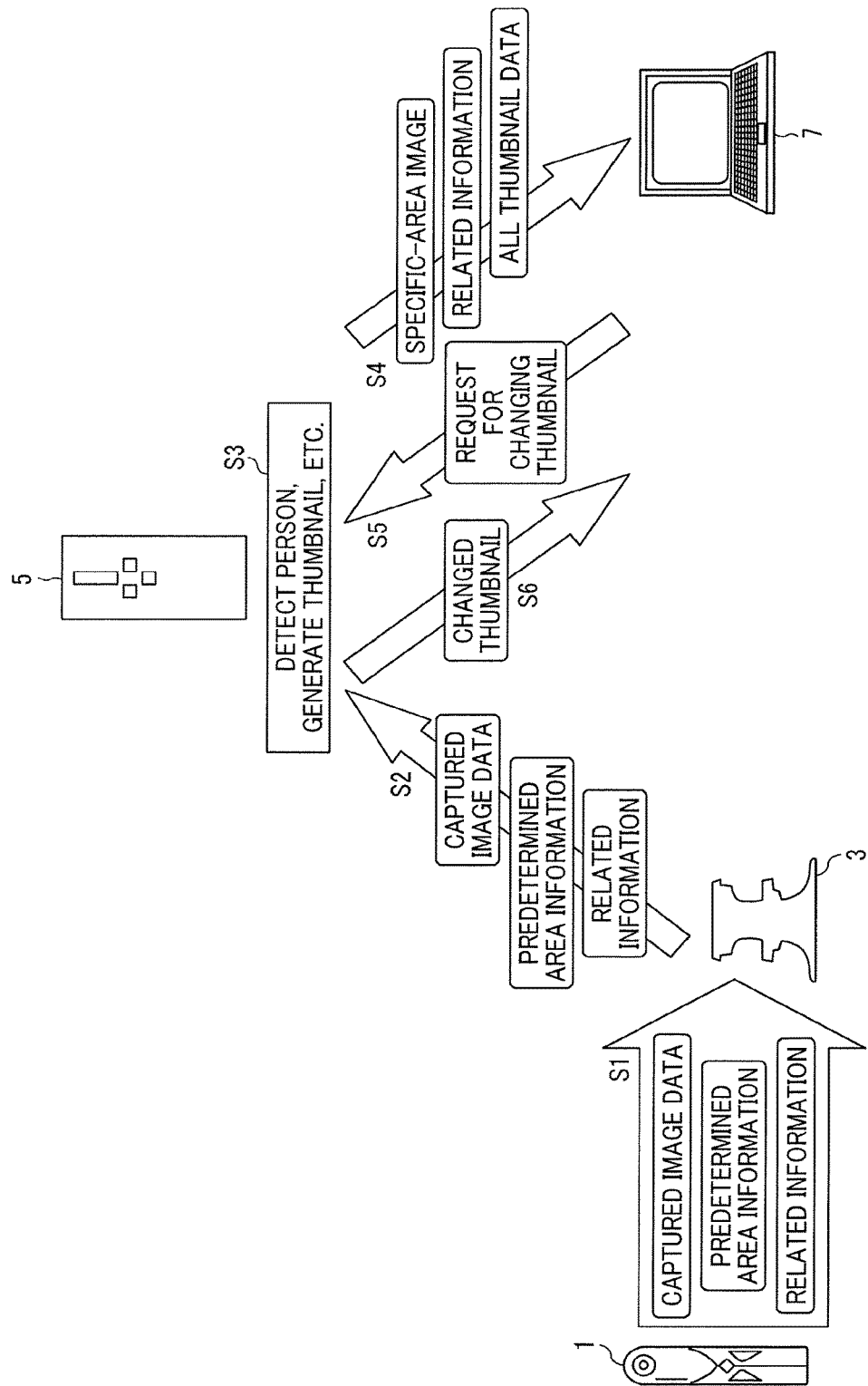
FIG. 12 is a view illustrating an overview of processing performed by the image management system according to an embodiment of the present invention.

Hereinafter, a description is given of an overview of processing performed by the image management system according to the present embodiment with reference to FIG. 12.

First, the communication terminal 3 acquires the captured-image data, the predetermined-area information, and the related information from the image capturing device 1 (S1). The communication terminal 3 transmits the captured-image data, the predetermined-area information, and the related information to the image management system 5 (S2). For example, the communication terminal 3 performs this data transmission at one-minute intervals. Next, the image management system 5 detects a person image, which is an image of a person, from the captured-image data, and generates thumbnail data based on the captured-image data (S3). Further, the image management system 5 transmits, to the communication terminal 7, the predetermined-area image, the related information, all thumbnail data of the predetermined-area image (S4). The communication terminal 7 transmits, to the image management system 5, a change request made by a viewer Y (S5). The change request requests a change to thumbnail display. The image management system 5 transmits, to the communication terminal 7, thumbnail data that has been changed in accordance with the change request (S6). For example, in a case in which the change request transmitted from the communication terminal 7 at S5 requests filtering the thumbnail data to thumbnail data generated based on the captured-image data containing a person image, the image management system 5 transmits at S6 the thumbnail data that has been filtered in accordance with the filtering request. With this process, it is possible to prevent a user viewing thumbnails having no or little change from being confused having no idea what appears in the thumbnail.

Figure 13:
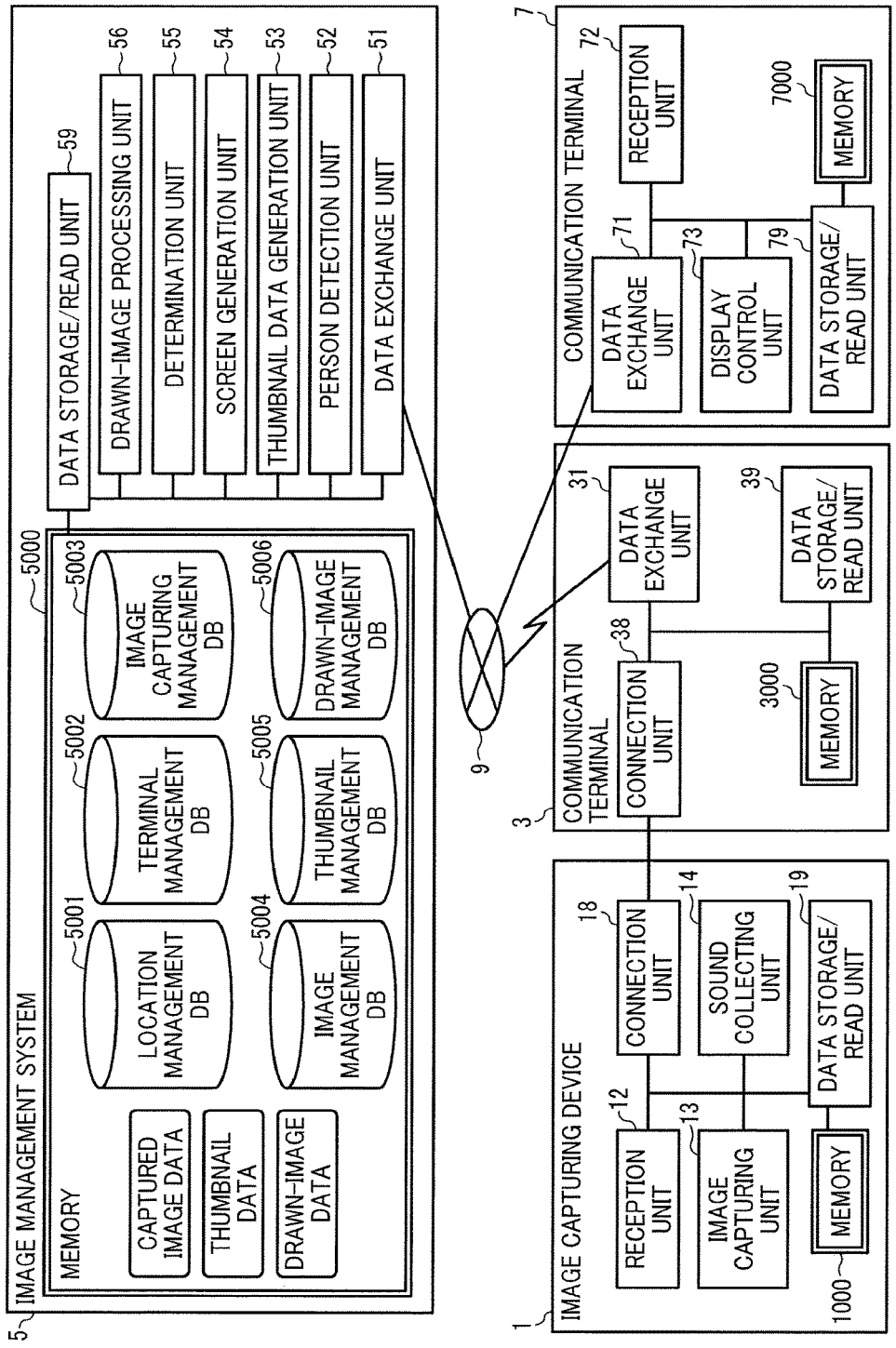
FIG. 13 is a block diagram illustrating a functional configuration of the image communication system according to an embodiment of the present invention.

Hereinafter, a description is given of a functional configuration of the image communication system according to this embodiment. FIG. 13 is a block diagram illustrating functional configurations of the image capturing device 1, the communication terminal 3, the image management system 5, and the communication terminal 7, which constitute a part of the image communication system according this embodiment. In the image communication system illustrated in FIG. 13, the image management system 5 performs data communication with the communication terminal 3 and communication terminal 7 via the communication network 9.

As illustrated in FIG. 13, the image capturing device 1 includes a reception unit 12, an image capturing unit 13, a sound collecting unit 14, a connection unit 18, and a data storage/read unit 19. These functional blocks 12 to 19 are implemented by one or more hardware components illustrated in FIG. 9, when operating in accordance with instructions from the CPU 111 executing according to the program for the image capturing device 1, loaded to the DRAM 114 from the SRAM 113.

The image capturing device 1 further includes a memory 1000, which is implemented by the ROM 112, the SRAM 113, or the DRAM 114 illustrated in FIG. 9.

Hereinafter, a detailed description is given of these functional blocks 12 to 19 of the image capturing device 1 with reference to FIGS. 9 and 13.

The reception unit 12 of the image capturing device 1 is implemented by the operation unit 115 and the CPU 111, which operate in cooperation with each other, to receive an instruction input from the operation unit 115 according to a user (the installer X in FIG. 8) operation.

The image capturing unit 13 is implemented by the imaging unit 101, the image processor 104, the imaging controller 105, and the CPU 111, which operate in cooperation with each other, to capture an image of the surroundings and acquire the captured-image data.

The sound collecting unit 14 is implement by the microphone 108 and the sound processor 109, when operating under control of the CPU 111, to collect sounds around the image capturing device 1.

The connection unit 18 is implement by an electrical contact, when operating under control of the CPU 111. The connection unit 18 is be provided with power from the communication terminal 3, and performs data communication.

The data storage/read unit 19 is implement by the CPU 111, when executing according to the program loaded to the DRAM 114, to store data or information in the memory 1000 and read out data or information from the memory 1000.

As illustrated in FIG. 13, the communication terminal 3 includes a data exchange unit 31, a connection unit 38, and a data storage/read unit 39. These functional blocks 31, 38 and 39 are implemented by one or more hardware components illustrated in FIG. 10, when operating in accordance with instructions from the CPU 301 executing according to the programs for the communication terminal 3, loaded to the RANI 303 from the EEPROM 304.

The communication terminal 3 further includes a memory 3000, which is implemented by the ROM 302, the RAM 303, and the EEPROM 304 illustrated in FIG. 10.

Hereinafter, a detailed description is given of these functional blocks 31, 38, and 39 with reference to FIGS. 10 and 13.

The data exchange unit 31 of the communication terminal 3 is implemented by the communication unit 313 illustrated in FIG. 13, when operating under control of the CPU 301, to exchange data with the image management system 5 via the wireless router 9a and the communication network 9.

The connection unit 38 is implement by an electrical contact, when operating under control of the CPU 301, to supply power to the communication terminal 3 and perform data communication.

The data storage/read unit 39 is implement by the CPU 301, when executing according to the program loaded to the RAM 303, to store data or information in the memory 3000 and read out data or information from the memory 3000.

Hereinafter, a description is given of a functional configuration of the image management system 5 with reference to FIGS. 11 and 13. The image management system 5 includes a data exchange unit 51, a person detection unit 52, a thumbnail data generation unit 53, a screen generation unit 54, a determination unit 55, a drawn-image processing unit 56, and a data storage/read unit 59. These functional blocks 51 to 56 and 59 are implemented by one or more hardware components illustrated in FIG. 11, when operating in accordance with instructions from the CPU 501 executing according to the programs for the image management system 5, loaded to the RAM 503 from the HD 504.

Figure 11:
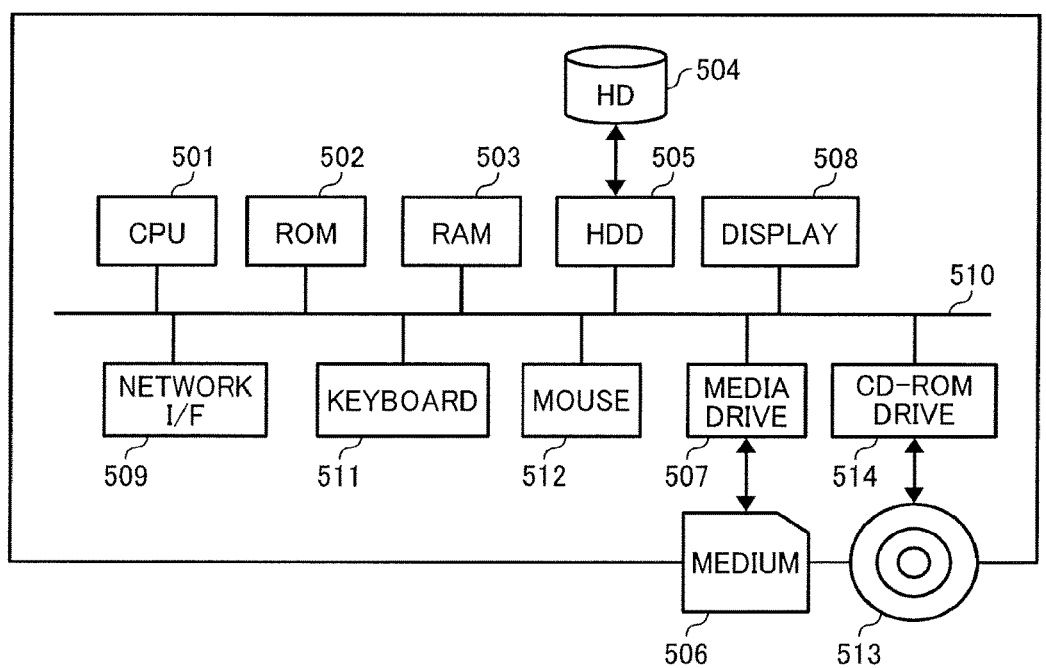
FIG. 11 is a block diagram illustrating a hardware configuration of any one of the image management system and the second communication terminal of FIG. 8 according to an embodiment of the present invention.
Figure 40:
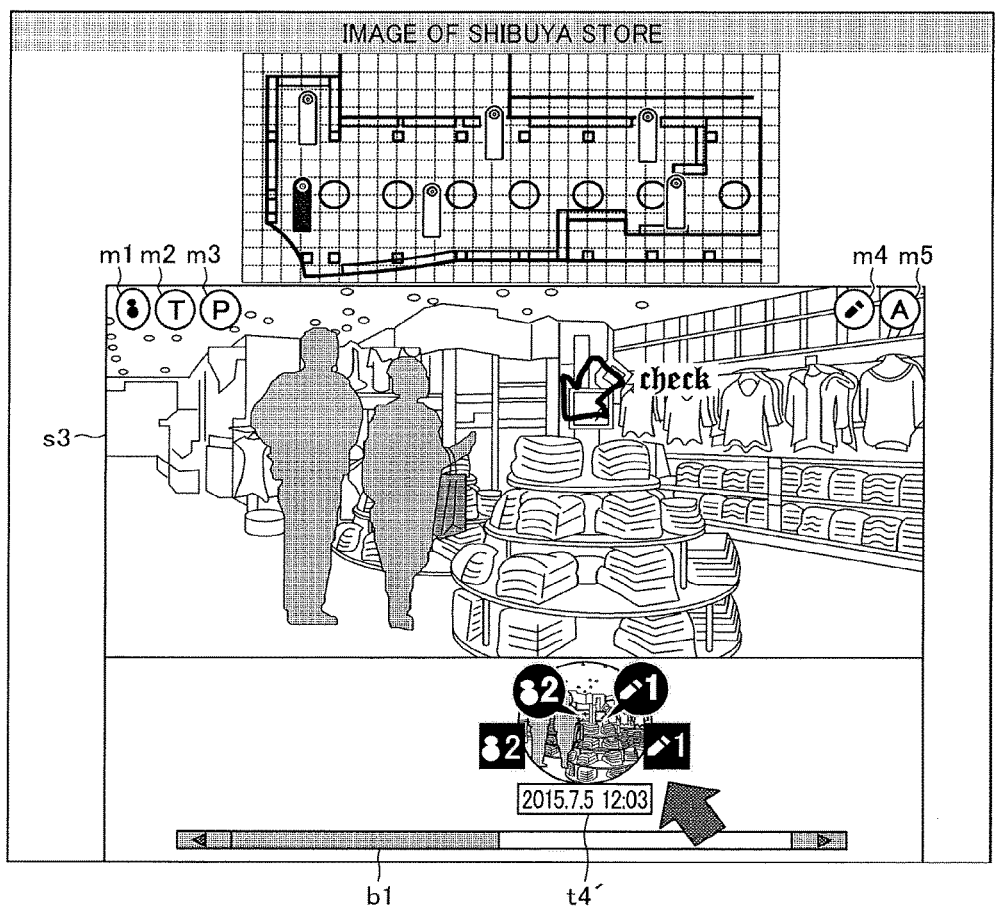
FIG. 40 is a view illustrating an example of the location status screen of a specific location according to an embodiment of the present invention.

The image management system 5 further includes a memory 5000, which is implemented by the RAM 503 and the HD 504 illustrated in FIG. 11. The memory 5000 stores the captured-image data transmitted from the communication terminal 3, the thumbnail data generated based on the captured-image data, and drawn-image data transmitted from the communication terminal 7. The drawn-image data is image data attached to the original captured-image data according to drawings by the viewer Y. For example, the drawn-image data indicates an arrow and a comment ("check" in this example) drawn by the viewer Y as illustrated in FIG. 40.

Further, the memory 5000 includes a location management database (DB) 5001, a terminal management DB 5002, an image capturing management DB 5003, an image management DB 5004, a thumbnail management DB 5005, and a drawn-image management DB 5006. A location management table, which is described below, constitutes the location management DB 5001. A terminal management table, which is described below, constitutes the terminal management DB 5002. An image capturing management table, which is described below, constitutes the image capturing management DB 5003. An image management table, which is described below, constitutes the image management DB 5004. A thumbnail management table, which is described below, constitutes the thumbnail management DB 5005. A drawn-image management table, which is described below, constitutes the drawn-image management DB 5006. Hereinafter, a description is given of each of these tables.

Figures 20, 21:
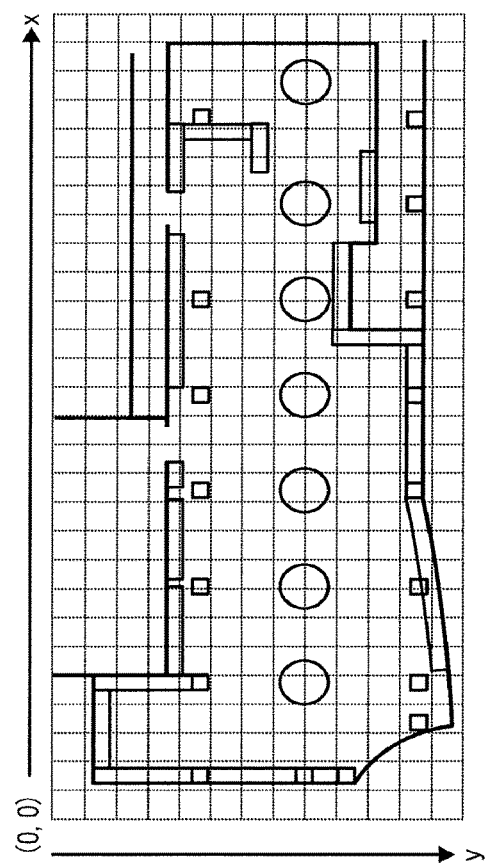
FIG. 20 is an example of a drawn-image management table according to an embodiment of the present invention.
FIG. 21 is a view illustrating an example of a location layout map according to an embodiment of the present invention.

FIG. 14 is an example of location management table. The location management table stores an area ID, an area name, a location ID, a location name, a file name of a location layout map, and a device ID in association with one another. The area ID is an example of area identification information for identifying an area. The area indicates a certain domain such as Tokyo, Shibuya-ku, New York State, and New York City. The location ID is an example of location identification information for identifying a sales location. The location name indicates a shop name such as Shibuya store, or a venue name such as Yurakucho venue. The location layout map represents, as illustrated in FIG. 21, a layout of each sales location. In the layout map, a position in the sales location is specified in detail by two-dimensional coordinates. FIG. 21 is a view illustrating an example of the location layout map. The device ID is an example of device identification information for identifying the image capturing device 1. Data of the layout maps of different sales locations are stored in the memory 5000.

FIG. 15 is an example of the terminal management table. The terminal management table stores device installation position information and the predetermined-area information in association with each device ID. The device installation position information indicates a position at which the image capturing device 1 is placed on the layout map represented by two-dimensional coordinate as illustrated in FIG. 21. The predetermined-area information stored in the terminal management table is the predetermined-area information as described above with reference to FIG. 7. The viewer Y obtains the device ID, the device installation position information, and the predetermined-area information in advance from the installer X The installer X sends a notice to the viewer Y by email and the like when the installer X places each image capturing device 1 at a specific position in the sales location.

FIG. 16 is an example of the image capturing management table. The image capturing management table stores a capturing title, a capturing start date and time, a capturing end date and time in association with location ID. The capturing title is a title input by the viewer Y. The viewer Y uses the capturing title to extract a desired captured image data from among a plurality of captured image data. The capturing start date and time is input by the viewer Y. The capturing start date and time indicates a date and time at which the image capturing device 1 starts (or started) image capturing. The capturing end date and time is input by the supervisor Y. The capturing end date and time indicates a date and time at which the image capturing device 1 is to stop (or stopped) image capturing.

FIG. 17 is an example of the image management table. The image management table stores a captured image ID, a file name of captured image data, and a capturing date and time of the captured image in association with each device ID. The captured image ID is an example of captured-image identification information for identifying captured image data. The file name of captured image data indicates a file name of the captured image data identified by the associated captured image ID. The capturing date and time of the captured image indicates a date and time at which the associated captured image data is captured by the image capturing device 1 identified by the device ID. The captured-image data are stored in the memory 5000.

FIG. 18 is an example of the thumbnail management table. The thumbnail management table stores a file name of thumbnail data, a captured image ID, related information related to captured-image data identified by the captured image ID in association with each thumbnail ID. Further, the related information includes a capturing date and time of the captured image, a capturing date and time of the person image, a number of detected person images, a person ID, a position and area of person, a number of drawn images, a drawing ID, and a position and area of drawn image.

The thumbnail ID is an example of thumbnail identification information for identifying the thumbnail data generated based on the captured-image data identified by the associated captured image ID. The file name of thumbnail data is a file name of the thumbnail data identified by the associated thumbnail ID. The captured image ID and the capturing date and time are the same ones as those of the image management table (see FIG. 17). The number of detected person images indicates a number of person images detected from the captured-image data by the person detection unit 52. The person ID is an example of person identification information for identifying a person image detected from the captured-image data by the person detection unit 52. In addition to detecting that a certain person image is included in the captured-image data, the person detection unit 52 distinguishes different persons based on a feature amount such as a height and width size of a person and color. Accordingly, in a case in which a same person image is detected in plural pieces of captured-image data, a same person ID is assigned to the same person image. Further, in a case in which two or more different person images are detected in the same captured image, different person IDs are assigned to the person images. The position and area of person indicates a specific point of the person image in the captured image data (full spherical panoramic image data), and an area represented by a width and a height. For example, as illustrated in FIG. 19A, the person image is detected in a form of a rectangle. An upper-left corner (x11, y11, z11) of the rectangle indicates the position of person. The area of person is indicated by the width (w11) of the rectangle and the height (h11) of the rectangle.

The number of drawn images indicates the number of the drawn-images that the viewer Y draws to the captured-image data while the captured image is displayed to the viewer Y. The drawing ID is an example of drawing identification information for identifying the drawn image. The position and area of drawn image a specific point of the drawn image in the captured image (full spherical panoramic image) data, and an area represented by a width and a height. For example, as illustrated in FIG. 19B, a drawn image drawn by the viewer Y at a same point of time is a rectangular image in a single file in the memory 5000. An upper-left corner (x21, y21, z21) of the rectangle indicates the position of the drawn image. The area of the drawn image is indicated by the width (w21) of the rectangle and the height (h21) of the rectangle.

FIG. 20 is an example of the drawn-image management table. The image management table stores a captured image ID, a drawing ID, a file name of drawn-image data, a position of drawn image, an area of drawn image, and a reference position in association with one another. The captured image ID is the same one of that of the image management table (see FIG. 17). The drawing ID is the same one of that of the thumbnail management table (see FIG. 18). The file name of drawn-image data indicates a file name of the drawn-image data identified by the associated drawing ID. The position of drawn image and the area of drawn image correspond to the position and area of drawn image of the thumbnail management table (see FIG. 18). The reference position indicates an initial position of the virtual camera IC in the three-dimensional virtual space. In other words, the reference position indicates the position of the initial point of view in the three-dimensional virtual space. It should be noted that data related to a change of display of the thumbnail management table from among the data stored in the drawn-image management table is separately stored in the thumbnail management table.

Hereinafter, a detailed description is given of the functional blocks 51 to 56 and 59 of the image management system 5 with reference to FIGS. 11 and 13.

The data exchange unit 51 of the image management system 5 is implemented by the network I/F 509 illustrated in FIG. 11, when operating under control of the CPU 501. The data exchange unit 51 exchanges data or information with the communication terminal 3 or the communication terminal 7 via the communication network 9.

The person detection unit 52 is implement by the CPU 501 illustrated in FIG. 11, when executing according to the program loaded to the RAM 503. The person detection unit 52 detects the person image in the captured-image data. The person image is detected, for example, using a person detection model such as the support vector machine (SVM). More specifically, the person detection unit 52 detects each person based on a feature amount of the person image in the captured-image data to specify a position of each detected person image in the captured image data (three-dimensional image data). This feature amount is, for example, a height and width size, color, and a face of a person.

The thumbnail data generation unit 53 is implement by the CPU 501 illustrated in FIG. 11, when executing according to the program loaded to the RAM 503. The thumbnail data generation unit 53 generates thumbnail data including the person image detected by the person detection unit 52.

The screen generation unit 54 is implement by the CPU 501 illustrated in FIG. 11, when executing according to the program loaded to the RAM 503. The screen generation unit 54 generates each of screens as illustrated in FIGS. 27 to 29, 31 to 32, and 35 to 40 described below.

The determination unit 55 is implemented by the CPU 501, when executing according to the program loaded to the RAM 503, to perform various determination. Specifically, the determination unit 55 determines whether the file name of captured-image data that has not yet been read out is present in the image management table (see FIG. 17) with respect to a period of time from the capturing start date and time to the capturing end date and time.

The drawn-image processing unit 56 is implement by the CPU 501 illustrated in FIG. 11, when executing according to the program loaded to the RAM 503. The drawn-image processing unit 56 generates an attachment image of the captured-image data based on a drawn image that is drawn by the viewer Y on the predetermined-area image corresponding to the captured-image data. Thus, an arrow and a comment ("check" in this example) is displayed as illustrated in FIG. 40 based on the drawn-image drawn by the viewer Y on the predetermined-area image that is displayed to the viewer Y at the communication terminal 7.

The data storage/read unit 59 is implement by the HDD 505, when operating under control of the CPU 501, to store data or information in the memory 5000 and read out data or information from the memory 5000.

Hereinafter, a description is given of a functional configuration of the communication terminal 7 with reference to FIGS. 11 and 13. The communication terminal 7 includes a data exchange unit 71, a reception unit 72, a display control unit 73, and a data storage/read unit 79. These functional blocks 71 to 74, and 79 are implemented by one or more hardware components illustrated in FIG. 11, when operating in accordance with instructions from the CPU 501 executing according to the programs for the communication terminal 7, loaded onto the RANI 503 from the HD 504.

The communication terminal 7 further includes a memory 7000, which is implemented by the RAM 503 and the HD 504 illustrated in FIG. 11.

Hereinafter, a detailed description is given of these functional blocks 71 to 74 and 79 with reference to FIG. 13.

The data exchange unit 71 of the communication terminal 7 is implemented by the network I/F 509 illustrated in FIG. 11, when operating under control of the CPU 501. The data exchange unit 71 exchanges data or information with image management system 5 via the communication network 9.

The reception unit 72 is implement by the keyboard 511 and the mouse 512 illustrated in FIG. 11, when operating under control of the CPU 501, to receive an instruction from a user, e.g., the viewer Y in FIG. 8.

The display control unit 73 is implemented by the CPU 501 illustrated in FIG. 11, when executing according to the program loaded onto the RANI 503, to control the display 508 of the communication terminal 7 to display images.

The data storage/read unit 79 is implement by the HDD 505, when operating under control of the CPU 501, to store data or information in the memory 7000 and read out data or information from the memory 7000.

Figure 22:
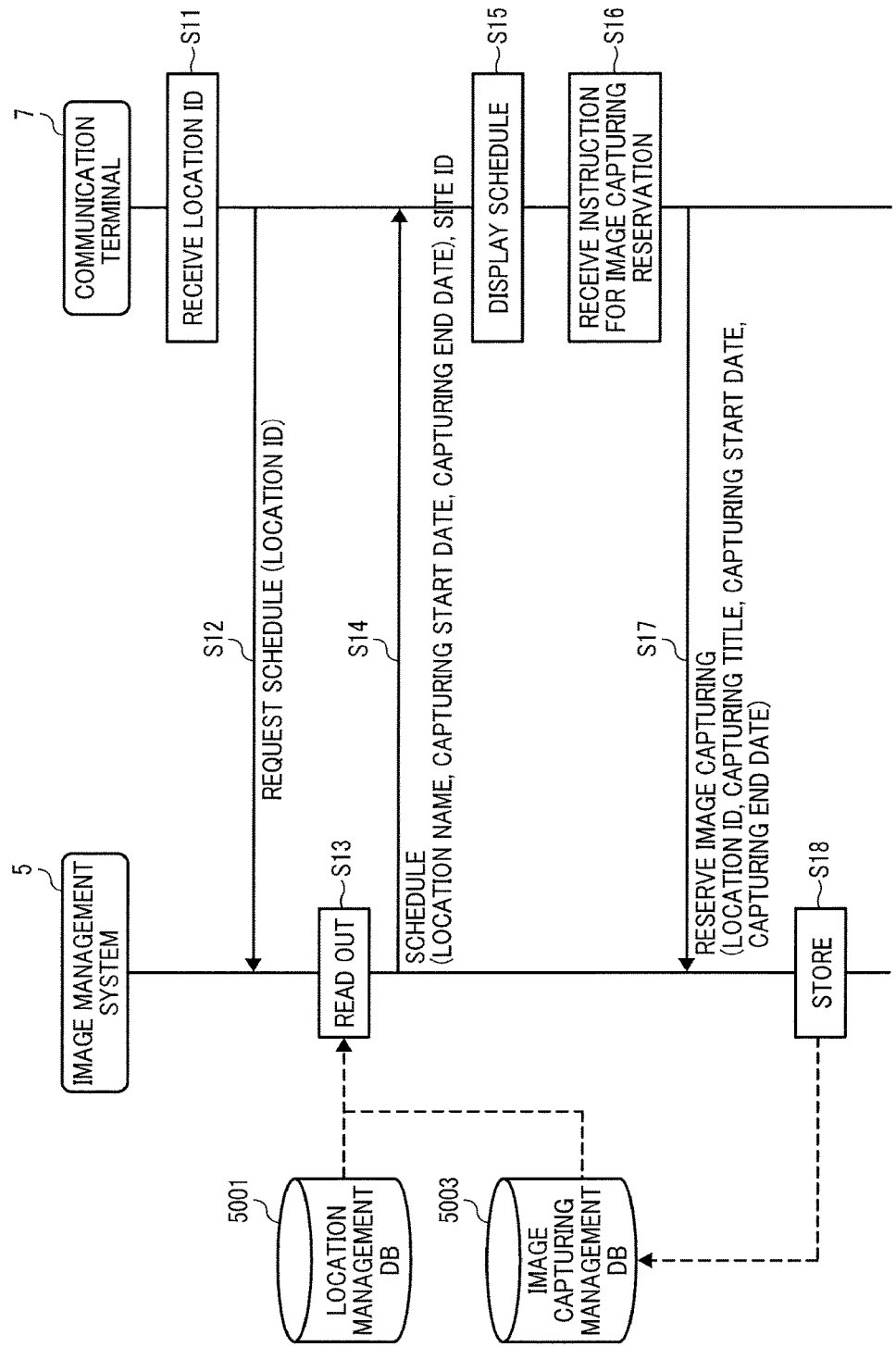
FIG. 22 is a sequence diagram illustrating an operation of making a reservation for image capturing according to an embodiment of the present invention.
Figure 28B:
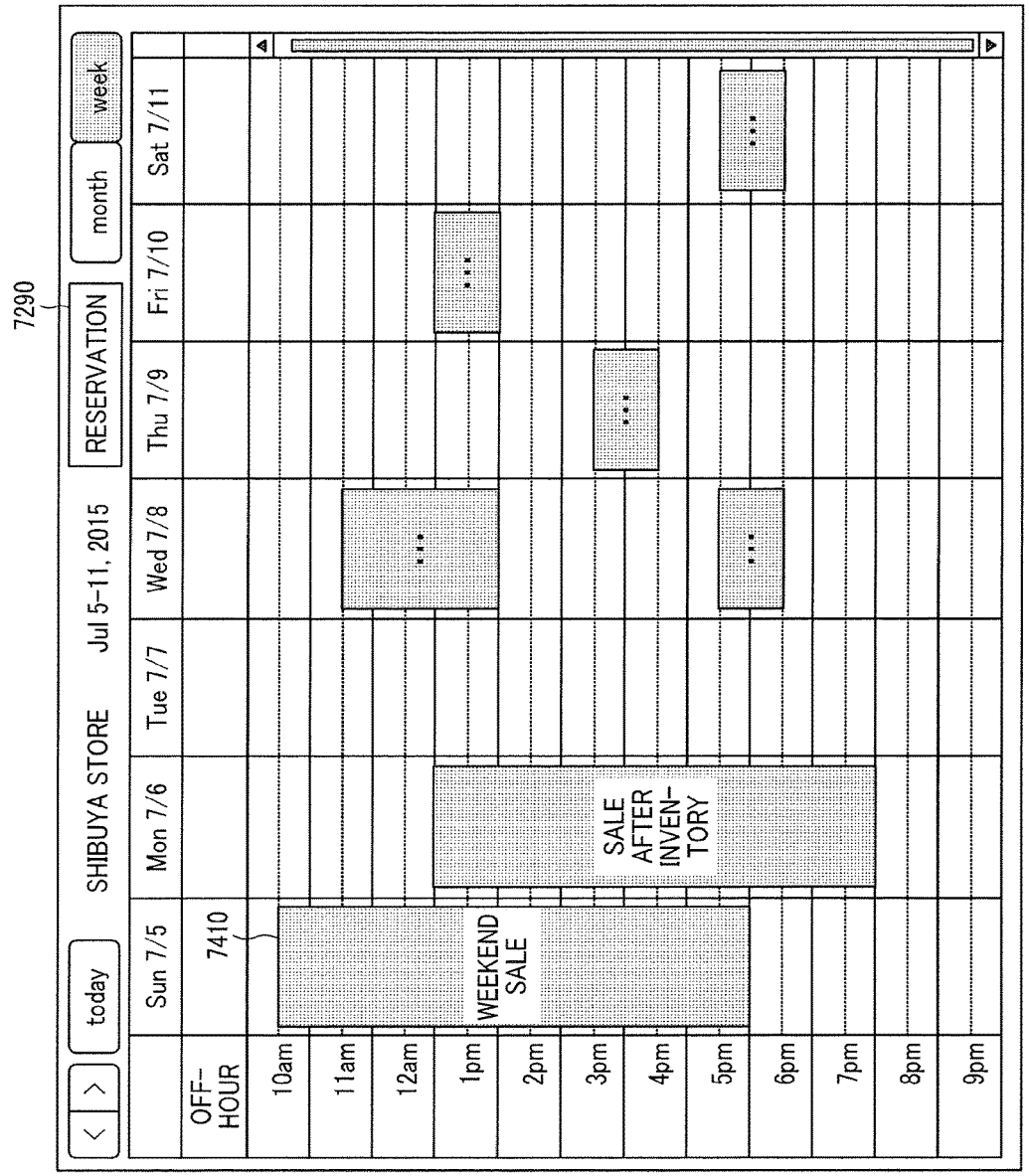
Figure 29A:
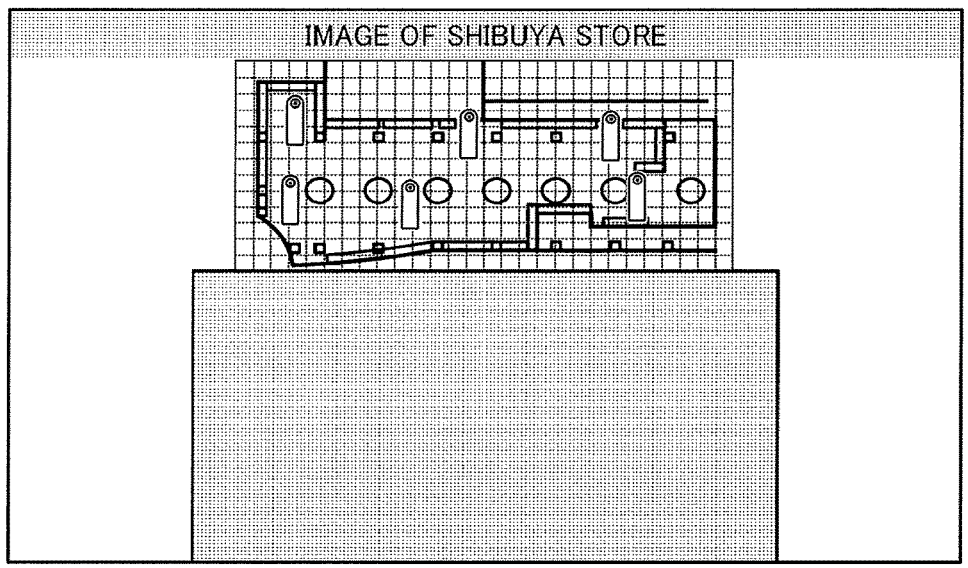
FIGS. 29A and 29B are views, each illustrating an example of a screen displaying a layout map according to an embodiment of the present invention.
Figure 29B:
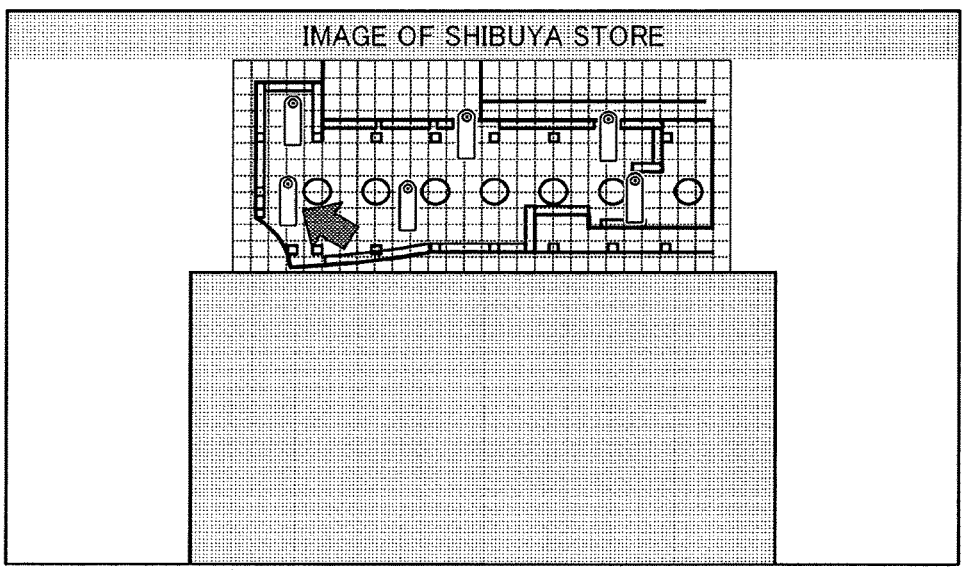
Figure 31:
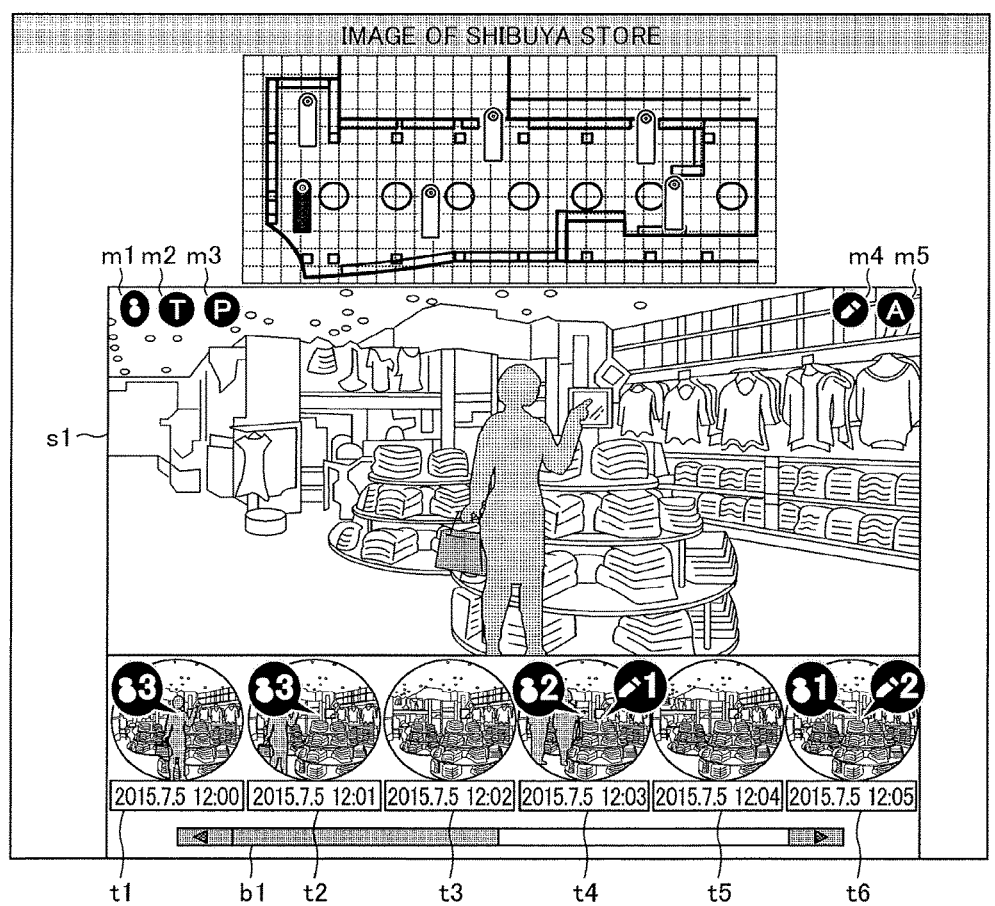
FIG. 31 is a view illustrating an example of a location status screen of a specific location according to an embodiment of the present invention.
Figure 32:
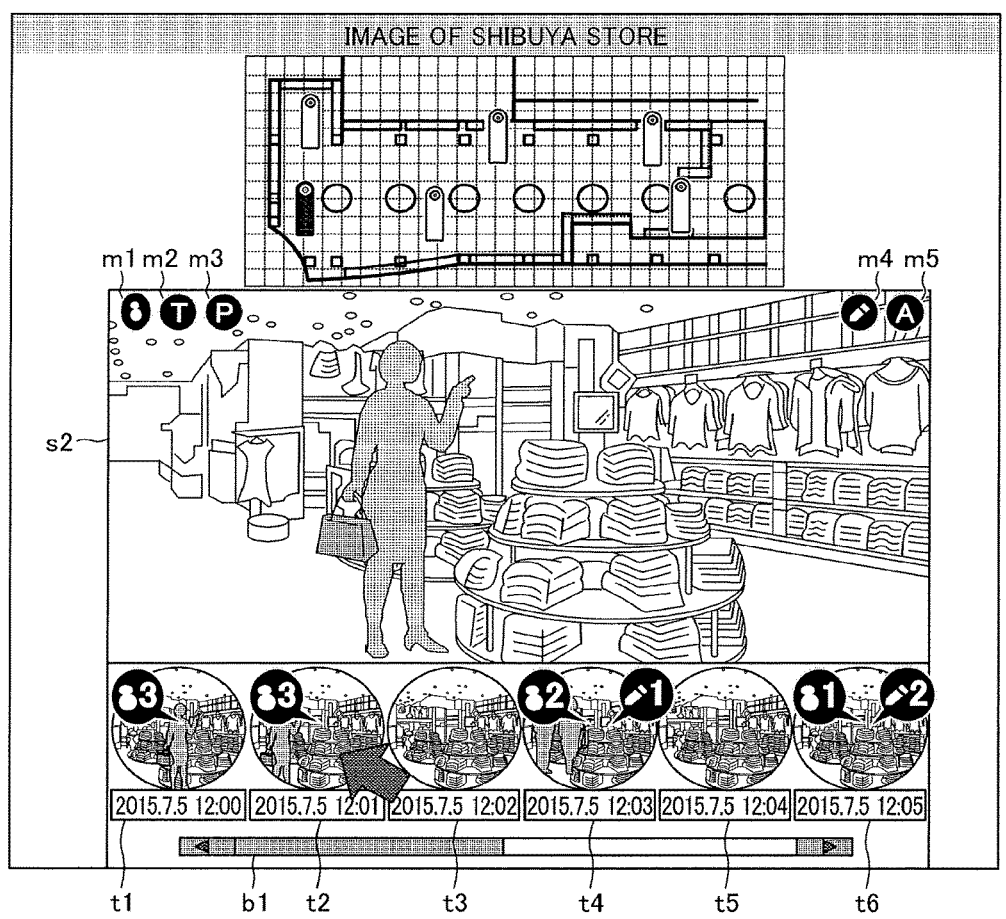
FIG. 32 is a view illustrating an example of the location status screen of a specific location according to an embodiment of the present invention.

Hereinafter, a description is given of operations performed by the image communication system with reference to FIGS. 22 to 40. First, a description is given of an operation of making a reservation for image capturing by the image capturing device 1, performed by the communication terminal 7 in accordance with an instruction from the viewer Y. FIG. 22 is a sequence diagram illustrating an operation of making a reservation for image capturing. Further, FIGS. 27A and 27B and FIGS. 28A and 28B each illustrates a schedule screen. FIGS. 29A and 29B are views each illustrating an example of a screen displaying a layout map. FIGS. 30A to 30D each illustrates the predetermined-area image in a specific location. FIGS. 31 and 32 are views each illustrating an example of the location status screen in a specific location. The layout map is displayed in an upper area of the location status screen. Further, the predetermined-area image (specific-area image) is displayed in a middle area of the location status screen. Furthermore, a thumbnail screen including one or more thumbnail is displayed in a lower area of the location status screen.

Figure 27A:
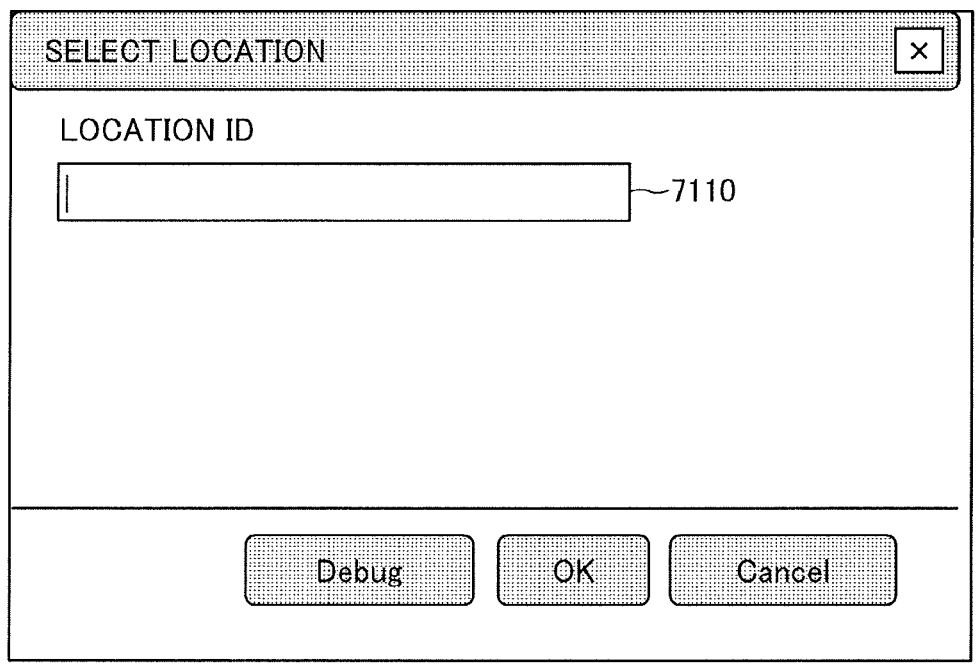

As illustrated in FIG. 22, when the viewer Y enters the location ID by the keyboard 511 or the mouse 512 of the communication terminal 7, the reception unit 72 receives an instruction for specifying the location ID (S11). Specifically, as illustrated in FIG. 27A, the field 7110 for entering the location ID is displayed on the display 508 of the communication terminal 7. The viewer Y enters, in the field 7110, the location ID corresponding to a location such as a sales location that the viewer Y wants to view. In response to the instruction received by the reception unit 72, the data exchange unit 71 sends a request for a schedule to the image management system 5 (S12). This request includes the location ID received by the reception unit 72 at S11. Thus, the data exchange unit 51 of the image management system 5 receives the request for the schedule from the communication terminal 7.

Figure 27B:
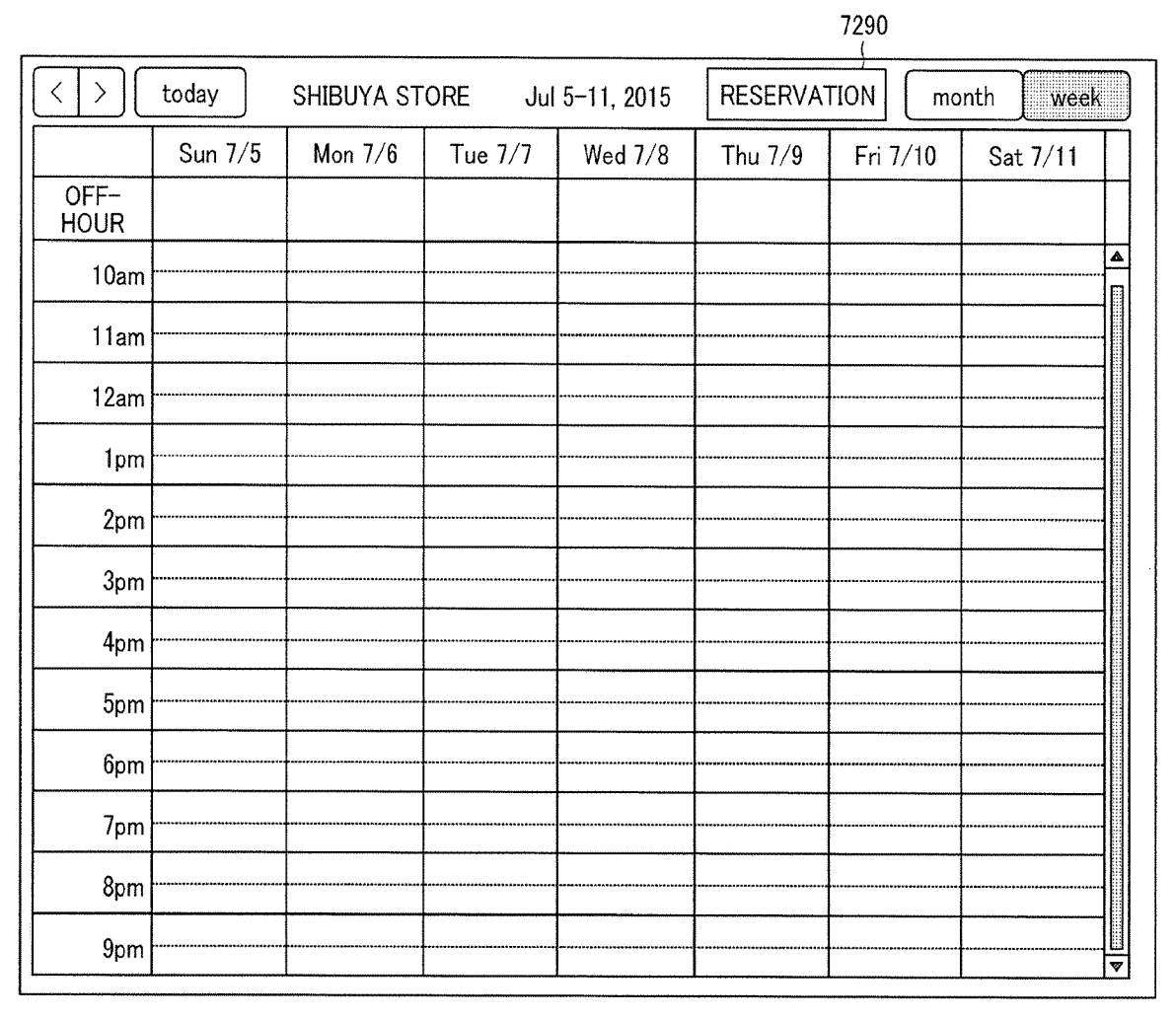

Next, at S13, the data storage/read unit 59 of the image management system 5 searches the image capturing management table (see FIG. 16) with the location ID received by the data exchange unit 51 as a retrieval key to read out the capturing title, the capturing start date and time, and the capturing end date and time associated with the location ID. In addition, at S13, the data storage/read unit 59 searches the location management table (see FIG. 14) with the location ID as a retrieval key to read out the location name associated with the location ID. Thereafter, the screen generation unit 54 generates the schedule screen as illustrated in FIG. 27B based on those information read out at S13. The data exchange unit 51 transmits data of the schedule screen to the communication terminal 7 (S14). The data exchange unit 51 also transmits the location ID together with the data of the schedule screen. Thus, the data exchange unit 71 of the communication terminal 7 receives the data of the schedule screen.

The display control unit 73 displays the schedule screen as illustrated in FIG. 27B on the display 508 of the communication terminal 7 (S15). The schedule screen includes a time table for each day of a week and a reservation key 7290. The reception unit 72 receives an instruction for making a reservation for image capturing from the viewer Y (S16). Specifically, when the viewer Y selects an item 7210 of a desired date and thereafter selects the reservation key with the keyboard 511 or the mouse 512, the display control unit 73 displays a "RESERVATION FOR IMAGE CAPTURING" menu as illustrated FIG. 28A. When the viewer Y enters the capturing title ("weekend sale" in this example), a capturing start time ("10:00" in this example), and a capturing end time ("18:00" in this example), and thereafter selects a "OK" key 7380, the data exchange unit 71 sends a reservation for image capturing to the image management system 5 (S17). This reservation for image capturing includes the location ID, the capturing title, the capturing start date and time, and the capturing end date and time. Thus, the data exchange unit 51 of the image management system 5 receives the reservation for image capturing.

Next, the data storage/read unit 59 of the image management system 5 adds, to the image capturing management table (see FIG. 16), a new record indicating a content of the reservation for image capturing (S18). After S18, the operation of making a reservation for image capturing ends. It should be noted that the schedule screen illustrated in FIG. 28B includes a time table for a week, alternatively the schedule screen may include a time table for a day, two weeks, or a month.

Figure 23:
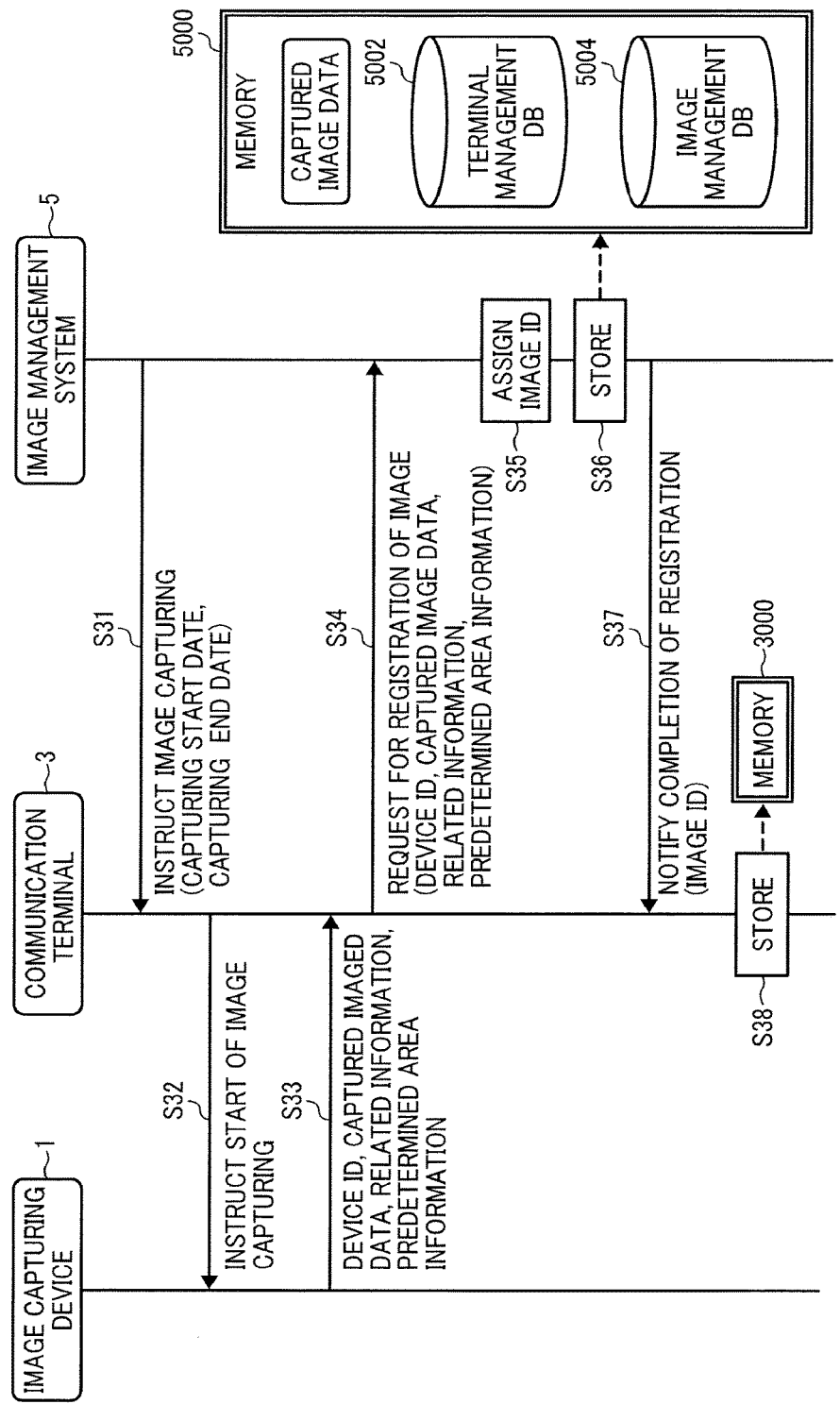
FIG. 23 is a sequence diagram illustrating an operation of instructing image capturing according to an embodiment of the present invention.

Hereinafter, a description is given of an operation of instructing the communication terminal 3 to capture an image, performed by the image management system 5 based on the image capturing management table (see FIG. 16). FIG. 23 is a sequence diagram illustrating an operation of instructing image capturing.

As illustrated in FIG. 23, the data exchange unit 51 of the image management system 5 sends an instruction for image capturing to every communication terminal 3 in the location represented by the location ID (S31). This instruction for image capturing includes the capturing start date and time, and the capturing end date and time. Thus, the communication terminal 3 receives the instruction for image capturing.

Next, at the capturing date and time included in the instruction transmitted from the image management system 5, the communication terminal 3 sends an instruction for starting image capturing to the image capturing device 1 (S32). Thus, the data exchange unit 11 of the image capturing device 1 receives the instruction for starting image capturing.

Next, the image capturing device 1 performs image capturing every ten minute, for example, and sends its own device ID, data of captured images (the captured image data), the related information, and the predetermined-area information to the communication terminal 3 (S33). The related information includes information on an actual capturing date and time, etc. The predetermined-area information includes information on a direction of a point of view that is preset before shipping. Thus, the data exchange unit 31 of the communication terminal 3 receives the device ID, the captured image data, the related information, and the predetermined-area information.

Next, the data exchange unit 31 of the communication terminal 3 sends, to the image management system 5, a request for image registration (S34). This request for image registration includes the device ID, the captured image data, the related information, and the predetermined-area information, which are sent from the image capturing device 1 at S33. Thus, the data exchange unit 51 of the image management system 5 receives the request for image registration. The data storage/read unit 59 of the image management system 5 assigns a new image ID to the captured image data received at S34 (S35).

Next, the data storage/read unit 59 stores these information in different tables for management (S36). Specifically, the data storage/read unit 59 overwrites the predetermined-area information corresponding to the device ID in the terminal management table (see FIG. 15). Further, the data storage/read unit 59 adds, to the image management table (see FIG. 17), a new record associating the device ID, the image ID, the file name of image data, and the capturing date and time with each other. The device ID that is added as the new record is the device ID received from the communication terminal 3 at S34. The image ID that is added as the new record is the image ID assigned at S35. The file name of image data that is added as the new record is the file name of the captured image data received from the communication terminal 3 at S34. The capturing date and time that is added as the new record is the capturing date and time included in the related information received from the communication terminal 3 at S34.

Next, the data exchange unit 51 sends, to the communication terminal 3, a notification indicating the image registration is completed (S37). This notification includes the image ID. Thus, the data exchange unit 31 of the communication terminal 3 receives the notification indicating that the image registration is completed. The data storage/read unit 39 of the communication terminal 3 stores the image ID in the memory 3000 (S38).

Figure 24:
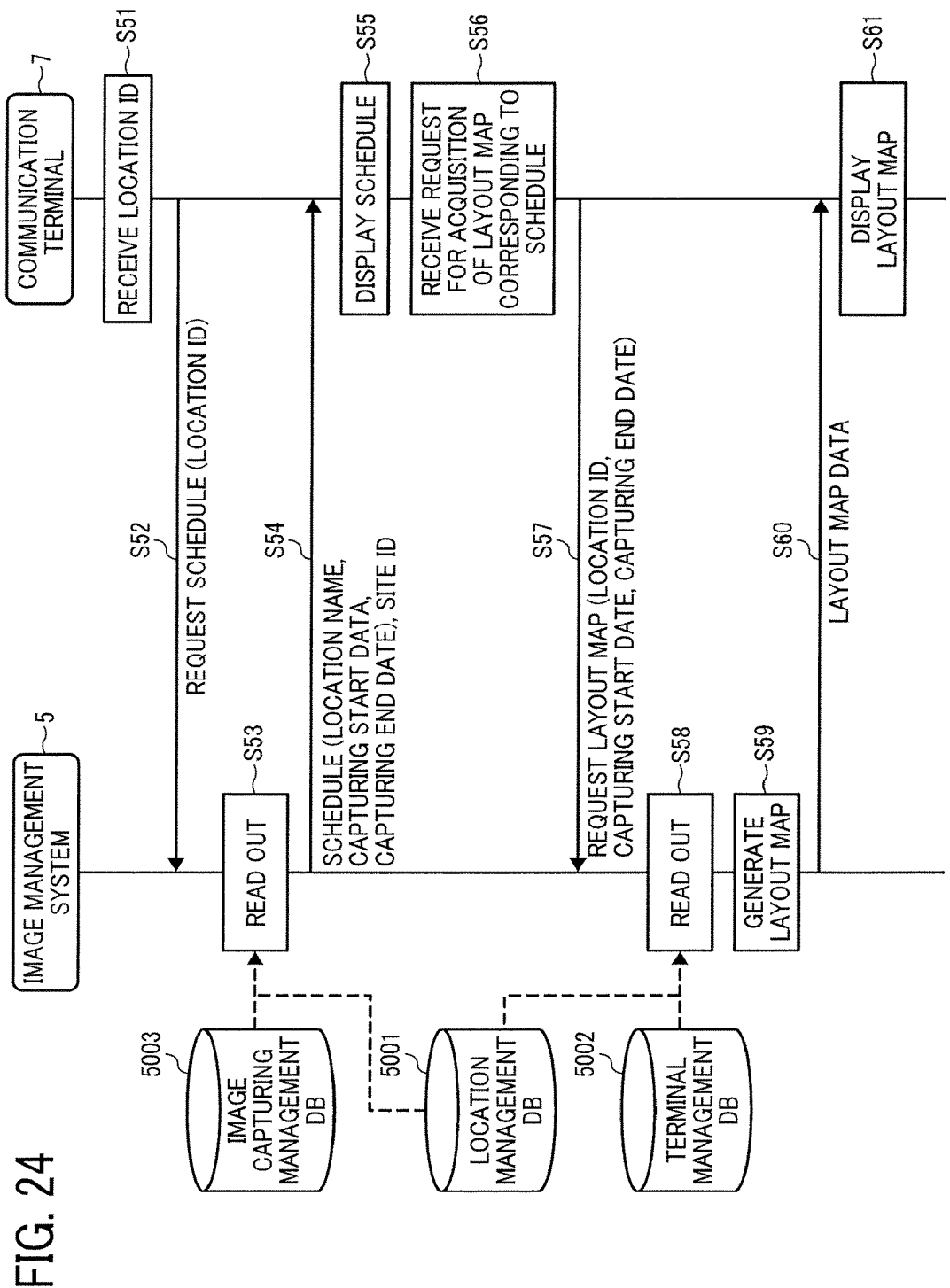
FIG. 24 is a sequence diagram illustrating an operation of displaying a layout map according to an embodiment of the present invention.

Hereinafter, a description is given of an operation of displaying the layout map. FIG. 24 is a sequence diagram illustrating an operation of displaying the layout map.

As illustrated in FIG. 24, when the viewer Y enters the location ID by the keyboard 511 or the mouse 512 of the communication terminal 7, the reception unit 72 receives an instruction for specifying the location ID (S51). Specifically, as illustrated in FIG. 27A, the field 7110 for entering the location ID is displayed on the display 508 of the communication terminal 7. The viewer Y enters, in the field 7110, the location ID corresponding to a location such as a sales location that the viewer Y wants to view. In response to receiving the instruction by the reception unit 72, the data exchange unit 71 sends a request for the schedule to the image management system 5 (S52). This request includes the location ID received by the reception unit 72 at S51. Thus, the data exchange unit 51 of the image management system 5 receives the request for the schedule from the communication terminal 7.

Next, at S53, the data storage/read unit 59 of the image management system 5 searches the image capturing management table (see FIG. 16) with the location ID received by the data exchange unit 51 as a retrieval key to read out the capturing title, the capturing start date and time, and the capturing end date and time associated with the location ID. In addition, at S53, the data storage/read unit 59 searches the location management table (see FIG. 14) with the location ID as a retrieval key to read out the location name associated with the location ID. Thereafter, the screen generation unit 54 generates the schedule screen as illustrated in FIG. 28B based on those information read out at S53. The data exchange unit 51 transmits data of the schedule screen to the communication terminal 7 (S54). The data exchange unit 51 also transmits the location ID together with the data of the schedule screen. Thus, the data exchange unit 71 of the communication terminal 7 receives the data of the schedule screen.

The display control unit 73 displays the schedule screen as illustrated in FIG. 28B on the display 508 of the communication terminal 7 (S55). The schedule screen as illustrated in FIG. 28B displayed at S55 is different from the schedule screen as illustrated in FIG. 27B displayed at S15 in that the reservation for image capturing has already been made. Specifically, as illustrated in FIG. 28B, the schedule screen displayed at S55 includes schedule information 7410 indicating the content of the reservation for image capturing performed at S16 to 18.

Next, when the viewer Y selects the schedule information 7410, for example, with the keyboard 511 or the mouse 512, the reception unit 72 receives an instruction for acquiring the layout map associated with the schedule information 7410 (S56). In response to receiving the instruction by the reception unit 72, the data exchange unit 71 sends a request for the layout map to the image management system 5 (S57). This request for the layout map includes the location ID, the capturing start date and time, and the capturing end date and time. Thus, the data exchange unit 51 of the image management system 5 receives the request for the layout map from the communication terminal 7.

Next, the data storage/read unit 59 of the image management system 5 searches the location management table (see FIG. 14) with the location ID received at S57 as a retrieval key to read out the file name of layout map associated with the location ID (S58). Further, the data storage/read unit 59 searches the location management table (see FIG. 14) with the location ID received at S57 as a retrieval key to read out the file name of layout map and the device ID associated with the location ID (S58). Further, the data storage/read unit 59 searches the terminal management table (see FIG. 15) with the read-out device ID as a retrieval key to read out the device installation position information and the predetermined-area information associated with the device ID (S58).

Next, the screen generation unit 54 generates the layout map using those information read out at S58 (S59). The data exchange unit 51 transmits data of the layout map to the communication terminal 7 (S60). Thus, the data exchange unit 71 of the communication terminal 7 receives the data of layout map from the image management system 5. The display control unit 73 displays the location status screen as illustrated in FIG. 29A on the display 508 of the communication terminal 7 (S61). A layout is displayed in an upper half area of the location status screen. The layout includes icons representing all of the capturing devices 1 located in the location.

Figure 25:
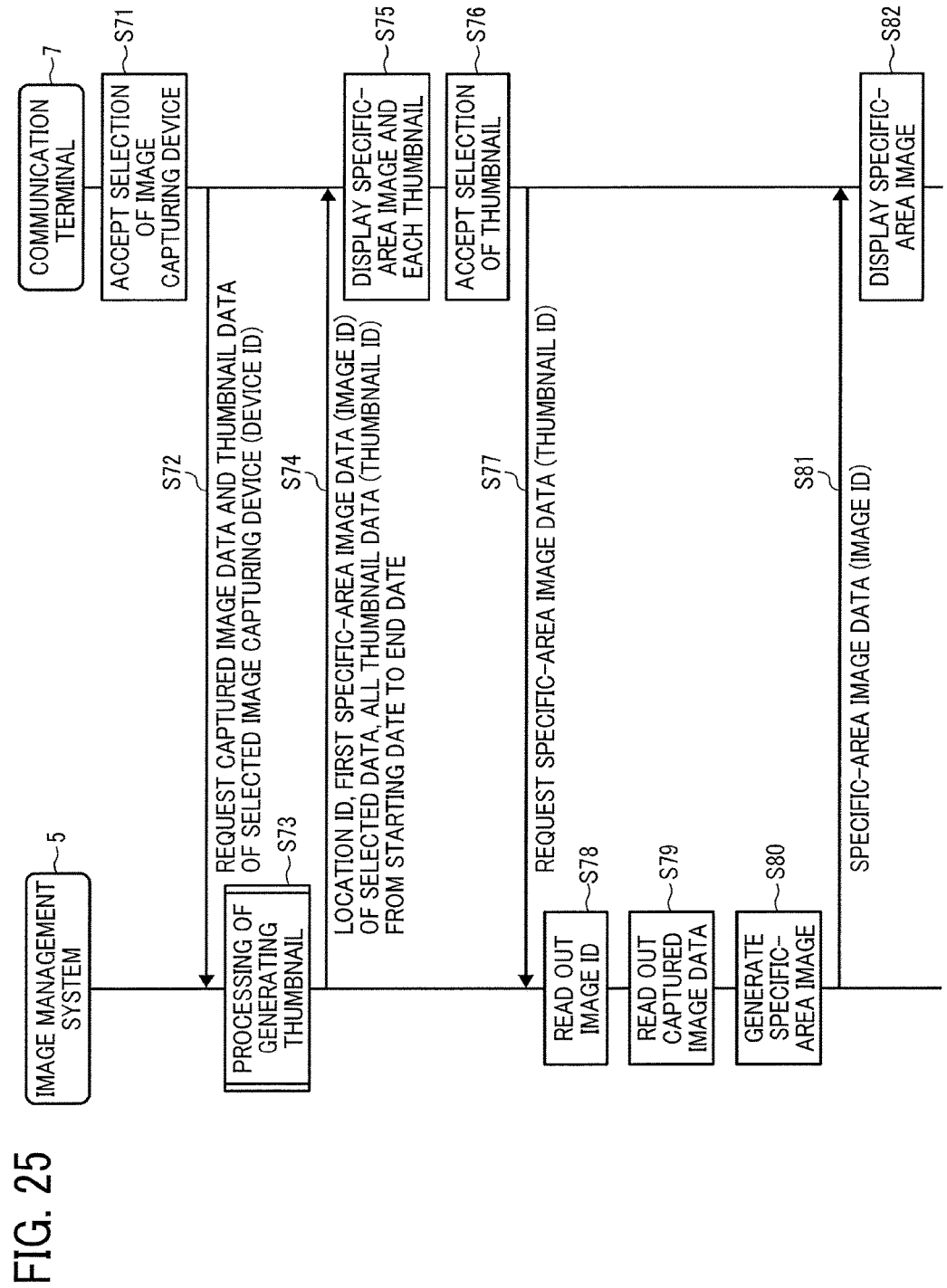
FIG. 25 is a sequence diagram illustrating an operation of displaying captured image data to an embodiment of the present invention.

Hereinafter, a description is given of displaying the captured image data. FIG. 25 is a sequence diagram illustrating an operation of displaying the captured image data.

First, as illustrated in FIG. 25, when the viewer Y selects an icon of a desired image capturing device 1 using the keyboard 511 or the mouse 512, for example, the reception unit 72 receives an instruction for selecting the image capturing device 1 (S71). In response to receiving the instruction by the reception unit 72, the data exchange unit 71 sends a request for the captured image data captured by the selected image capturing device 1 and thumbnail data (S72). This request includes the device ID of the image capturing device 1 corresponding to the selected icon. Thus, the data exchange unit 51 of the image management system 5 receives the request for the captured image data and the thumbnail data.

Figure 26:
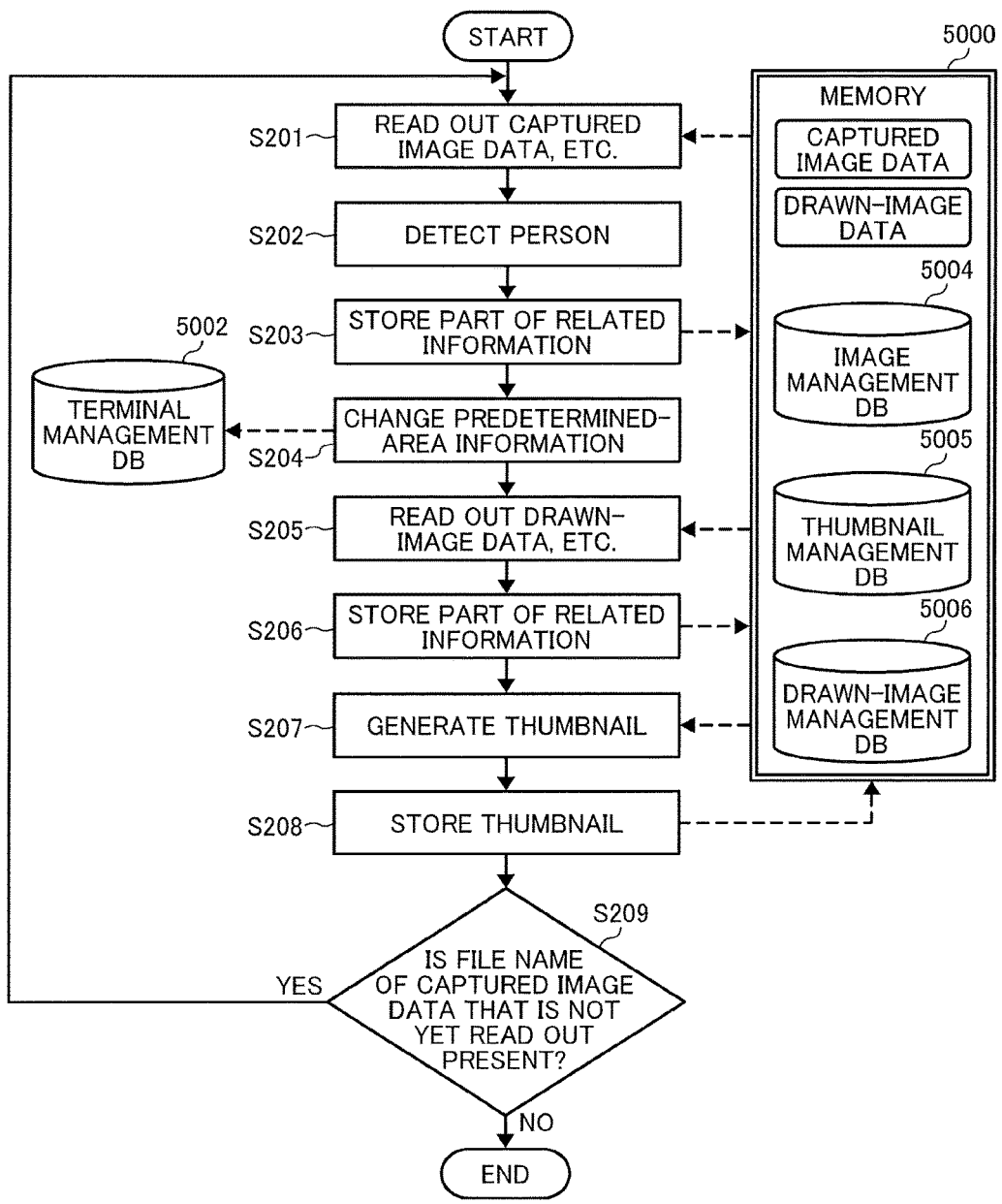
FIG. 26 is a flowchart illustrating an operation of generating a thumbnail according to an embodiment of the present invention.

Next, the image management system 5 performs an operation of generating a thumbnail (S73). Hereinafter, a description is given of an operation of generating the thumbnail with reference to FIG. 26. FIG. 26 is a flowchart illustrating an operation of generating the thumbnail.

First, at S201, the data storage/read unit 59 of the image management system 5 searches the image management table (see FIG. 17) with the device ID received at S72 as a retrieval key to read out the file name of captured image data associated with the device ID. This search is made for records in the image capturing management table corresponding to a time period from the capturing start date and time to the capturing start date and time received at S57, that is, a time period from the capturing start date and time to the capturing end date and time stored in the image capturing management table (see FIG. 16). In addition, at S201, the data storage/read unit 59 retrieves the captured image data corresponding to the read-out file name from the memory 5000. Next, the person detection unit 52 performs processing for detecting the person image in the captured-image data (S202). In this case, the person detection unit 52 detects the human image in the captured-image data. The data storage/read unit 59 assigns a new thumbnail ID in the thumbnail management table (see FIG. 18) and stores, in association with the new thumbnail ID, the captured image ID, and a part of the related information, which is a result of the detection of person image (S203). Specifically, the capturing date and time of the captured image, the number of detected person images, the person ID, and the position and area of person constitute the part of the related information stored at S203. Hereinafter, a description is given of a case in which the person detection unit 52 detects the person image, and a person represented by the person image is not included in the predetermined-area image specified by the predetermined-area information stored in advance in the terminal management table.

The data storage/read unit 59 replaces the predetermined-area information associated with the device ID received at S72 in the terminal management table (see FIG. 15) with information indicating a specific area that includes the person image (S204). Such information indicating the specific area that includes the person image is referred to as "specific-area information" hereinafter. For example, the predetermined-area image specified by initial predetermined-area information includes a pole as illustrated in FIG. 30A. In other words, the predetermined-area image specified by the initial predetermined-area information does not include the person image as illustrated in FIG. 30A. After the predetermined-area information is replaced with the specific-area information that indicates the specific-area including the person image at S204, the specific-area information is kept stored in the terminal management table. Accordingly, specific-area images each including the person image in a chronological order is generated as illustrated in FIGS. 30B to 30D.

Next, at S205, the data storage/read unit 59 searches the drawn-image management table (see FIG. 20) with the captured image ID of the captured-image data that is read out at S201 as a retrieval key to read out the drawing ID, the file name of drawn-image data, the position of drawn image, and the area of drawn image associated with the captured image ID. In addition, at S205, the data storage/read unit 59 retrieves the drawn-image data corresponding to the file name from the memory 5000.

Then, the data storage/read unit 59 stores a part of the related information in association with the captured image ID in the thumbnail management table (see FIG. 18) based on the drawing ID, the position of drawn image, and the area of drawn image that are read out at S205 (S206). Specifically, the number of drawn-images, the drawing ID, and the position and area of drawn image constitute the part of the related information stored at S206. The number of drawn-images is specified by the number of the drawing IDs associated with the same captured image ID in the drawn-image management table (see FIG. 20). The drawing ID corresponds to the drawing ID in the drawn-image management table (see FIG. 20). The position and area of drawn image corresponds to the position of drawn image and the area of drawn image in the drawn-image management table (see FIG. 20).

Next, the thumbnail data generation unit 53 generates thumbnail data based on the specific-area image indicated by the specific-area information that is stored in the terminal management table (see FIG. 15) and the related information stored in the thumbnail management table (see FIG. 18) (S207). For example, the thumbnail data generation unit 53 generates a thumbnail t1 as illustrated in a lower left portion of FIG. 31. The thumbnail t1 is a thumbnail of a specific-area image s1. The thumbnail t1 includes the capturing date and time in a bottom portion thereof. Further, the thumbnail t1 includes an icon indicating the number of detected person images ("3" in this example) in an upper left portion thereof. The number of detected person image included in the thumbnail indicates the number of persons detected in the entire captured-image data (full spherical panoramic image data). In other words, the number of detected person image included in the thumbnail does not indicate the number of persons detected in the specific-area image. Further, the thumbnail t1 indicates that an original captured-image data does not include the drawn-image data. By contrast, in a case in which an original captured-image data includes the drawn-image data, the thumbnail, like a thumbnail t4, includes an icon indicating the number of drawn-images in an upper right portion of the thumbnail.

Next, at S208, the data storage/read unit 59 stores the thumbnail data generated at S207 in the memory 5000. In addition, at S208, the data storage/read unit 59 generates a new file name of thumbnail data and stores the new file name of thumbnail data in the thumbnail management table (FIG. 18).

Then, the determination unit 55 determines whether the file name of captured-image data that has not yet been read out is present in the image management table (see FIG. 17) with respect to a period of time from the capturing start date and time to the capturing end date and time received at S57 (S209). When the determination unit 55 determines that the file name of captured-image data that has not yet been read out is present (S209: YES), the operation returns to S201. By contrast, when the determination unit 55 determines that no file name of captured-image data that has not yet been read out is present (S209: NO), the operation of generating the thumbnail at S73 ends.

Referring back to FIG. 25, the data exchange unit 51 of the image management system 5 transmits, to the communication terminal 7, the location name, a first one of the captured-image data of the selected date and time, all thumbnail data corresponding to the period of time from the capturing start date and time to the capturing end date and time, and the capturing date and time (S74). Further, at S74, the data exchange unit 51 transmits the image ID identifying the captured-image data together with the captured-image data. Furthermore, at S74, the data exchange unit 51 transmits the thumbnail ID of each thumbnail data together with the thumbnail data. Thus, the data exchange unit 71 of the communication terminal 7 receives the location name, the first one of the captured-image data of the selected date and time, all thumbnail data corresponding to the period of time from the capturing start date and time to the capturing end date and time, and the capturing date and time.

Next, as illustrated in FIG. 31, the display control unit 73 of the communication terminal 7 displays, as the location status screen, the specific-area image and each thumbnail in a lower area of the location status image illustrated in FIG. 31 (S75). In FIG. 31, a specific-area image s1 including a person image is displayed. A person display icon m1, a time interval display icon m2, and an overlay display icon m3 are displayed in an upper left portion of the specific-area image s1. Further, a drawn-image display icon m4 and an area limitation icon m5 are displayed in an upper right portion of the specific-area image s1. From among these icons, the person display icon m1 is an icon used for filtering a plurality of thumbnails to only include a thumbnail or thumbnails, each being generated based on the captured-image data including the person image. The time interval display icon m2 is an icon used for displaying thumbnails at a distance interval reflecting a time interval between each capturing date and time of the original captured-image data. The overlay display icon m3 is an icon used for displaying, from among the plurality of thumbnails, two or more thumbnails each generated based on the captured-image data including the same person image, such that one thumbnail is laid over a part of the other thumbnail. The drawn-image display icon m4 is an icon used for filtering a plurality of thumbnails to only include a thumbnail or thumbnails, each being generated based on the captured-image data including the drawn-image. The area limitation icon m5 is an icon used for limiting an area that is searched for the person image and the drawn-image from the full spherical panoramic image to a specific image area. In addition, a scrollbar b1 is displayed below the thumbnails. The scrollbar b1 is used for displaying a thumbnail or thumbnails that cannot be displayed at one time.

When the viewer Y selects a second thumbnail from the left, i.e., a thumbnail t2 as illustrated in FIG. 32 with the keyboard 511 or the mouse 512, the reception unit 72 receives an instruction for selecting the thumbnail t2 (S76). In response to receiving the instruction by the reception unit 72, the data exchange unit 71 sends a request for data of the specific-area image to the image management system 5 (S77). This request includes the thumbnail ID of the thumbnail selected at S76. Thus, the data exchange unit 51 of the image management system 5 receives the request for the data of the specific-area image from the communication terminal 7.

Next, the data storage/read unit 59 of the image management system 5 searches the thumbnail management table (see FIG. 18) with the thumbnail ID received at S77 as a retrieval key to read out the image ID associated with the thumbnail ID (S78). Further, at S79, the data storage/read unit 59 searches the image management table (see FIG. 17) with the image ID that is read out at S78 as a retrieval key to read out the file name of the captured-image data associated with the image ID. In addition, at S79, the data storage/read unit 59 reads out the captured-image data corresponding to the read-out file name.

Next, the data exchange unit 51 generates the specific-area image from the captured-image data that is read out at S79 based on the specific-area information (S80). The data exchange unit 51 transmits data of the specific-area image to the communication terminal 7 (S81). The data exchange unit 51 also transmits the image ID that is read out at S78 together with the data of the specific-area image. Thus, the data exchange unit 71 of the communication terminal 7 receives the captured-image data and the image ID.

Next, as illustrated in FIG. 32, the display control unit 73 of the communication terminal 7 displays the specific-area image corresponding to the thumbnail selected by the viewer Y on the display 508 (S82). With the operation described heretofore, the viewer Y is able to view the specific-area image of a desired image capturing date and time.

Figure 33:
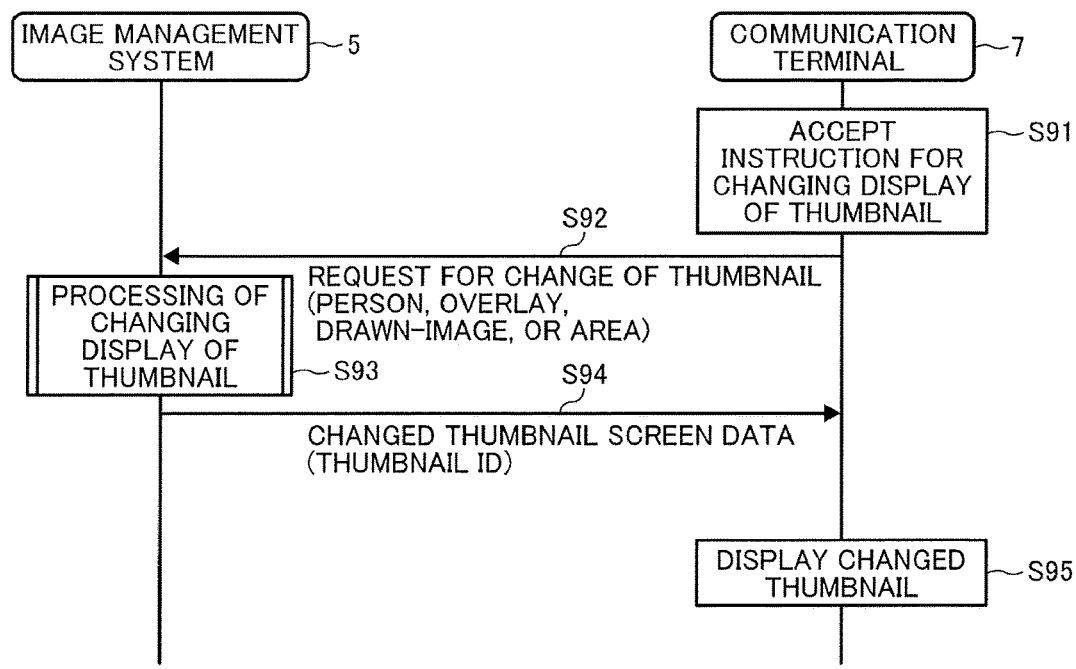
FIG. 33 is a sequence diagram illustrating an operation of changing a thumbnail display according to an embodiment of the present invention.
Figure 34:
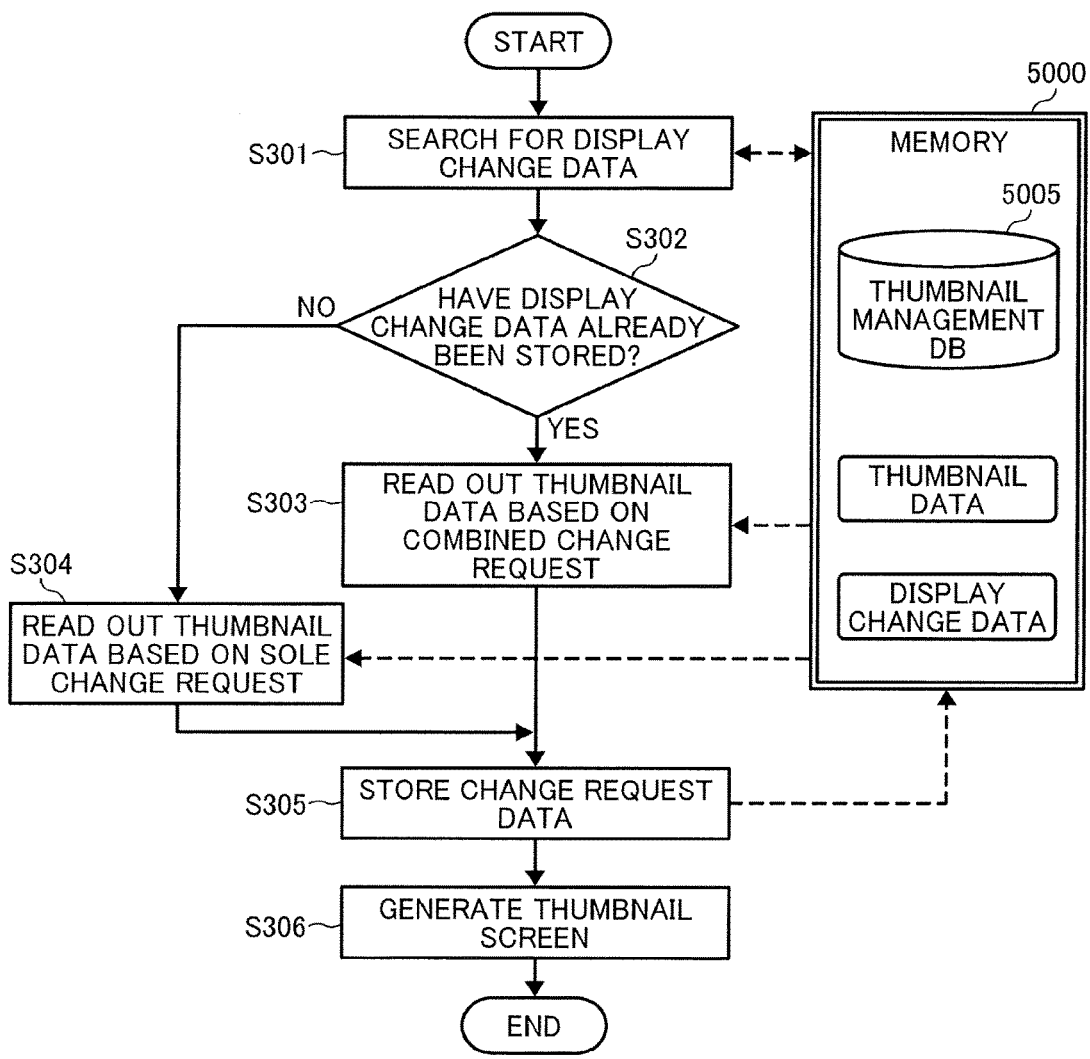
FIG. 34 is a flowchart illustrating an operation of changing the thumbnail display according to an embodiment of the present invention.

Hereinafter, a description is given of changing a thumbnail display with reference to FIG. 33 to FIG. 40. FIG. 33 is a sequence diagram illustrating an operation of changing a thumbnail display. FIG. 34 is a flowchart illustrating an operation of changing a thumbnail display. FIGS. 35 to 40 are views each illustrating the location status screen of a specific location.

Figure 35:
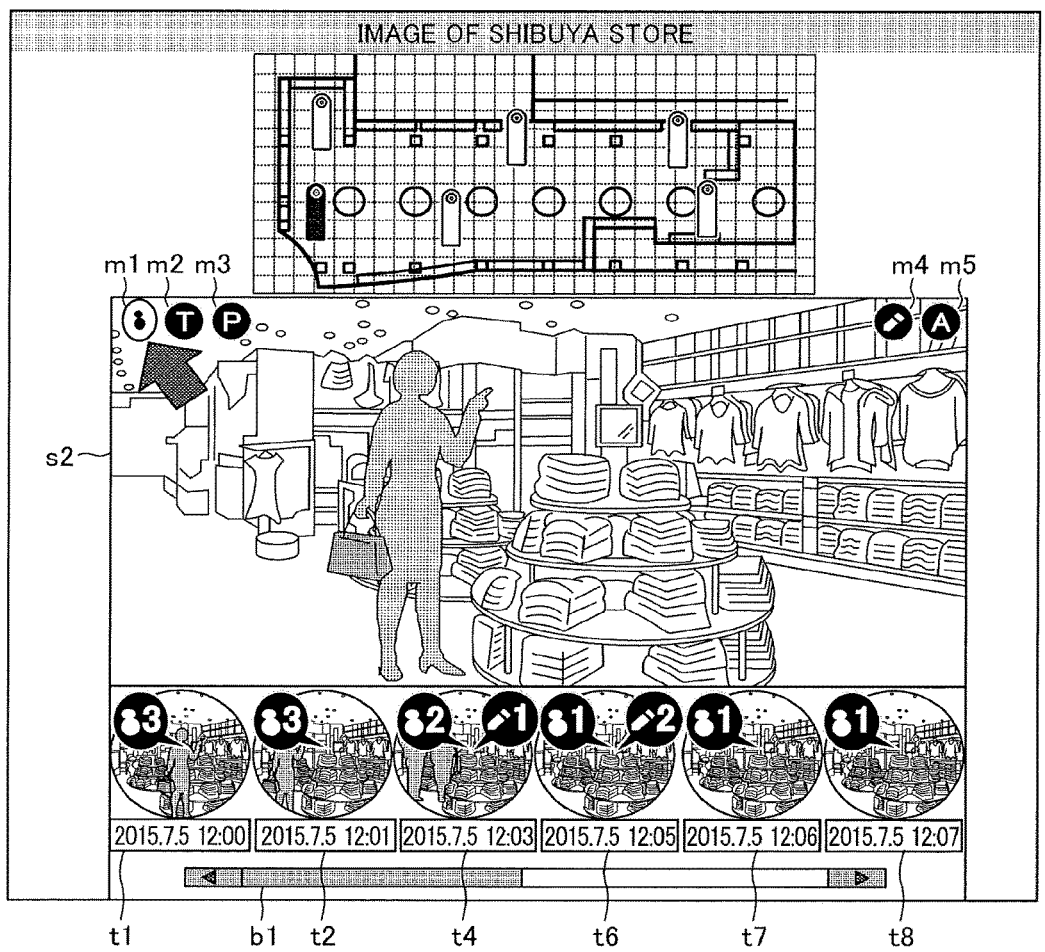
FIG. 35 is a view illustrating an example of the location status screen of a specific location according to an embodiment of the present invention.

First, assuming that the location status screen as illustrated in FIG. 32 is displayed to the viewer Y, the viewer Y moves a cursor to select the person display icon m1 as illustrated in FIG. 35 using the keyboard 511 or the mouse 512, for example. In accordance with the user selection of the person display icon m1, the reception unit 72 of the communication terminal 7 receives an instruction for changing the thumbnail display (S91). In response to receiving the instruction, the data exchange unit 71 transmits, to the image management system 5, a change request for changing a current thumbnail display to a specific thumbnail or thumbnails corresponding to specific thumbnail information associated with specific related information from among predetermined related information (S92). More specifically, the change request made by selecting the person display icon m1 is a request for filtering the current thumbnail display to only include a thumbnail or thumbnails, each being generated based on the captured-image data including at least one person image. Thus, the data exchange unit 51 of the image management system 5 receives the change request.

Next, the image management system 5 performs an operation of changing the thumbnail display (S93). Hereinafter, a description is given of an operation of changing the thumbnail display with reference to FIG. 34.

As illustrated in FIG. 34, the data storage/read unit 59 searches the memory 5000 for change request data indicating a content of the change request (S301). In a case in which the change request data has been already stored in the memory 5000 (S302: YES), the data storage/read unit 59 searches the thumbnail management table (see FIG. 18) with a combination of the content of the change request data that is searched at S301 and the content of the change request that is received at S92 as a retrieval key to read out the file name or file names of thumbnail data associated with the contents of the change request (S303). Further, at S303, the data storage/read unit 59 retrieves the thumbnail data corresponding to the file name(s) from the memory 5000. By contrast, in a case in which no change request data has been stored yet in the memory 5000 (S302: NO), the data storage/read unit 59 searches the thumbnail management table (see FIG. 18) with the content of the change request that is received at S92 as a retrieval key to read out the file name or file names of thumbnail data associated with the contents of the change request (S304). Further, at S304, the data storage/read unit 59 retrieves the thumbnail data corresponding to the file name(s) from the memory 5000. At first, assuming that no change request data has been stored yet in the memory 5000 (S302: NO), the data storage/read unit 59 searches the thumbnail management table (see FIG. 18) based on the single change request to read out the file name or file names of thumbnail data associated with the number of detected person images being one or more. Then, the data storage/read unit 59 retrieves the thumbnail data corresponding to the file name(s) from the memory 5000.

Next, the data storage/read unit 59 overwrites current change request data with the combination of the change request data used as the retrieval request at S303 in the memory 5000 (S305). Alternatively, at S305, the data storage/read unit 59 stores the initial change request data used as the retrieval key at S304 in the memory 5000. In this example operation, the data storage/read unit 59 stores the initial change request data used as the retrieval key at S304 in the memory 5000. Then, the screen generation unit 54 generates the thumbnail screen data including each thumbnail (S306). Thus, the operation of changing the thumbnail display at S93 ends.

Referring back to FIG. 33, the data exchange unit 51 transmits the changed thumbnail screen data generated at S93 (S306) to the communication terminal 7 (S94). Further, at S94, the data exchange unit 51 transmits the thumbnail ID identifying each thumbnail data. Thus, the data exchange unit 71 of the communication terminal 7 receives the changed thumbnail screen data and the thumbnail ID.

Next, as illustrated in FIG. 35, the display control unit 73 of the communication terminal 7 displays thumbnails t1, t2, t4, t6, t7, and t8 of which original captured-image data includes at least one person image. In other words, in an example of FIG. 35, the display control unit 73 does not display thumbnails t3 and t5 of which original captured-image data include no person image. In this example of FIG. 35, because the thumbnails t3 and t5 are not displayed, the new thumbnails t7 and t8 are displayed as being moved to the left.

Each step illustrated in FIGS. 33 and 34 is performed when other change requests are made in accordance with a user instruction. Accordingly, hereinafter a brief description is given of other change request.

Figure 36:
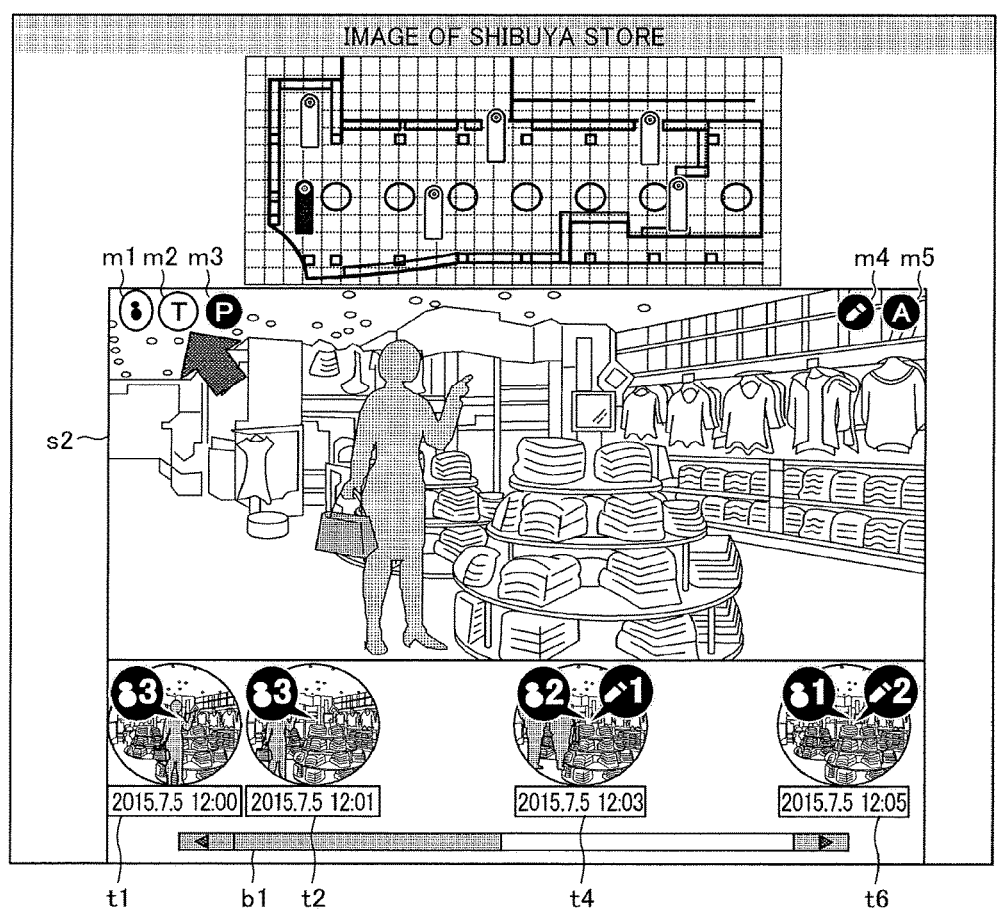
FIG. 36 is a view illustrating an example of the location status screen of a specific location according to an embodiment of the present invention.

Assuming that the location status screen as illustrated in FIG. 35 is displayed to the viewer Y, the viewer Y moves a cursor to select the time interval display icon m2 as illustrated in FIG. 36 using the keyboard 511 or the mouse 512, for example. In accordance with the user selection of the time interval display icon m2, the reception unit 72 of the communication terminal 7 receives an instruction for changing the thumbnail display at S91. In this case, the change request transmitted at S92 is a request for changing a current thumbnail display to include a plurality of thumbnails at a distance interval therebetween corresponding a time interval of the capturing date and time. In this example, the display change data that is stored in response to the user selection of the person display icon m1 is retrieved at S301. Accordingly, at S303, specific thumbnail data is read out based on the change request corresponding to the selection of both the person display icon m1 and the time interval display icon m2. It should be noted that, in response to the user selection of the time interval display icon m2, the data storage/read unit 59 searches the "capturing date and time" from among the related information of the thumbnail management table (see FIG. 18) at S303. Further, at S306, the screen generation unit 54 generates the thumbnail screen data including the specific thumbnails that are read out at S303, such that the specific thumbnails arranged at a distance interval reflecting a time interval of the capturing date and time.

At S94, the data exchange unit 51 transmits the changed thumbnail screen data generated at S93 (S306) to the communication terminal 7. At S95, as illustrated in FIG. 36, the display control unit 73 of the communication terminal 7 displays the thumbnails t1, t2, t4, and t6 arranged at a distance interval reflecting a time interval of the capturing date and time. In this example, because a blank area representing a time interval is inserted, the thumbnails t7 and t8 that are displayed on the screen illustrated in FIG. 35 is no more displayed on the screen illustrated in FIG. 36 as they are moved to the right outside the screen. The scrollbar b1 is moved to the right to display the thumbnails t7 and t8.

Figure 37:
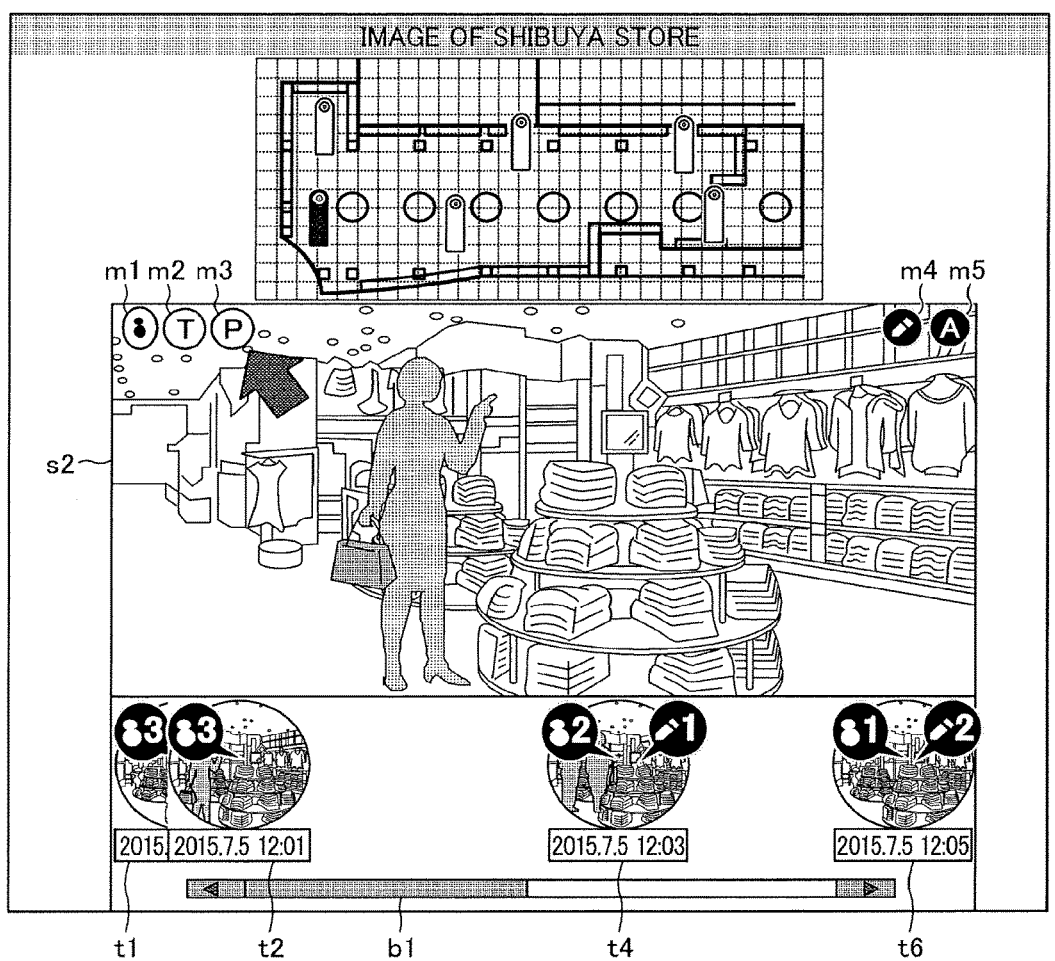
FIG. 37 is a view illustrating an example of the location status screen of a specific location according to an embodiment of the present invention.

Subsequently, assuming that the location status screen as illustrated in FIG. 36 is displayed to the viewer Y, the viewer Y moves a cursor to select the overlay display icon m3 as illustrated in FIG. 37 using the keyboard 511 or the mouse 512, for example. In accordance with the user selection of the overlay display icon m3, the reception unit 72 of the communication terminal 7 receives an instruction for changing the thumbnail display at S91. In this case, the change request transmitted at S92 is a request for changing a current thumbnail display to include a plurality of thumbnails, among which two or more specific thumbnails, each being generated based on the captured-image data including the same person image, are displayed, such that one thumbnail is laid over the other thumbnail. In this example, the display change data that is stored in response to the user selection of the person display icon m1 and the time interval display icon m2 is retrieved at S301. Accordingly, at S303, specific thumbnail data is read out based on the change request corresponding to the selection of three icons, that is, the person display icon m1, the time interval display icon m2, the overlay display icon m3. It should be noted that, in response to the user selection of the overlay display icon m3, the data storage/read unit 59 searches the "person ID" from among the related information of the thumbnail management table (see FIG. 18) at S303. Further, at S306, the screen generation unit 54 generates the thumbnail screen data including the specific thumbnails that are read out at S303, such that, among the specific thumbnails, two or more thumbnails including the same person image are overlaid one another. The thumbnail data generation unit 53 does not overlay the thumbnails even when each thumbnail is associated with the same number of the detected person images, as long as the person ID associated with each thumbnail is not same with each other.

At S94, the data exchange unit 51 transmits the changed thumbnail screen data generated at S93 (S306) to the communication terminal 7. At S95, as illustrated in FIG. 37, the display control unit 73 of the communication terminal 7 displays the thumbnails t1 and t2 such that at least parts of the thumbnails t1 and t2 are overlaid one another.

Figure 38:
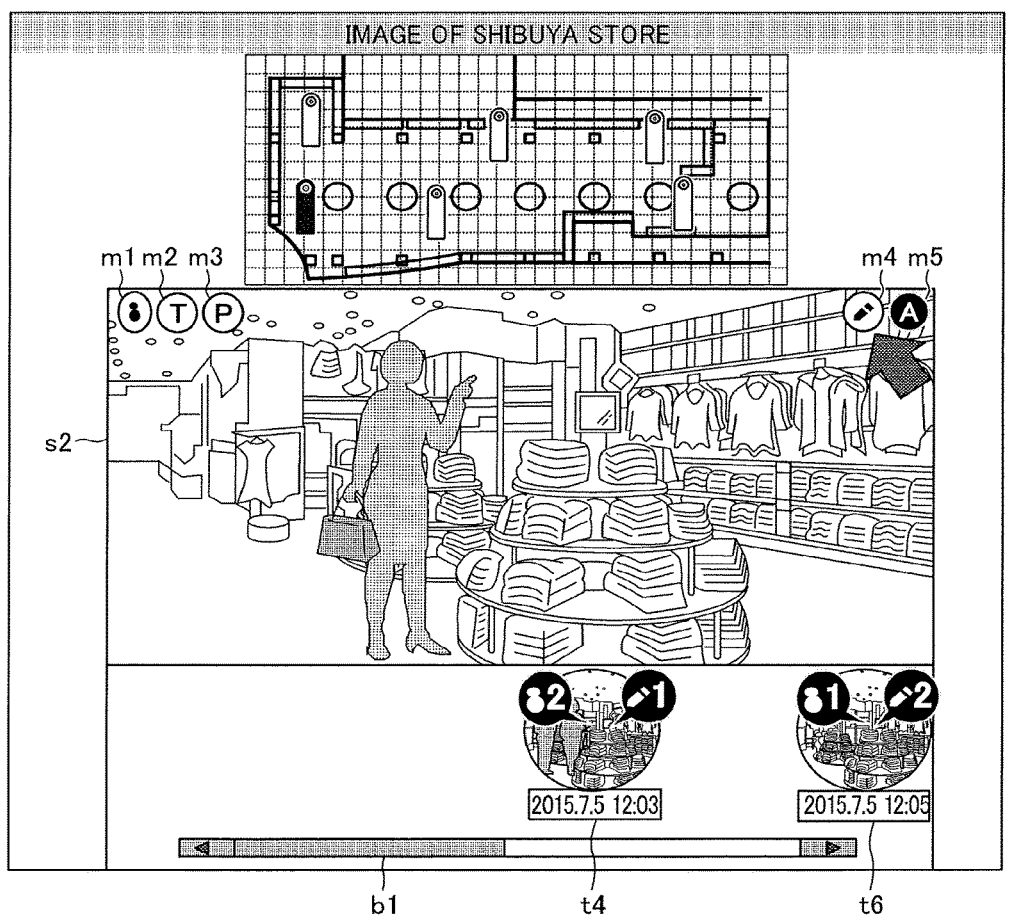
FIG. 38 is a view illustrating an example of the location status screen of a specific location according to an embodiment of the present invention.

Subsequently, assuming that the location status screen as illustrated in FIG. 37 is displayed to the viewer Y, the viewer Y moves a cursor to select the drawn-image display icon m4 as illustrated in FIG. 38 using the keyboard 511 or the mouse 512, for example. In accordance with the user selection of the drawn-image display icon m4, the reception unit 72 of the communication terminal 7 receives an instruction for changing the thumbnail display at S91. In this case, the change request transmitted at S92 is a request for filtering a current thumbnail display to only include a thumbnail or thumbnails, each including at least one drawn-image. In this example, the display change data that is stored in response to the user selection of the person display icon m1, the time interval display icon m2, and the overlay display icon m3 is retrieved at S301. Accordingly, at S303, specific thumbnail data is read out based on the change request corresponding to the selection of four icons, that is, the person display icon m1, the time interval display icon m2, the overlay display icon m3, and the drawn-image display icon m4. It should be noted that, in response to the user selection of the drawn-image display icon m4, the data storage/read unit 59 searches the "the number of drawn images" from among the related information of the thumbnail management table (see FIG. 18) at S303. Further, at S306, the screen generation unit 54 generates the thumbnail screen data including the specific thumbnails, each being generated based on the captured-image data including at least one drawn-image.

At S94, the data exchange unit 51 transmits the changed thumbnail screen data generated at S93 (S306) to the communication terminal 7. At S95, as illustrated in FIG. 38, the display control unit 73 of the communication terminal 7 displays the thumbnails t4 and t6.

Figure 39:
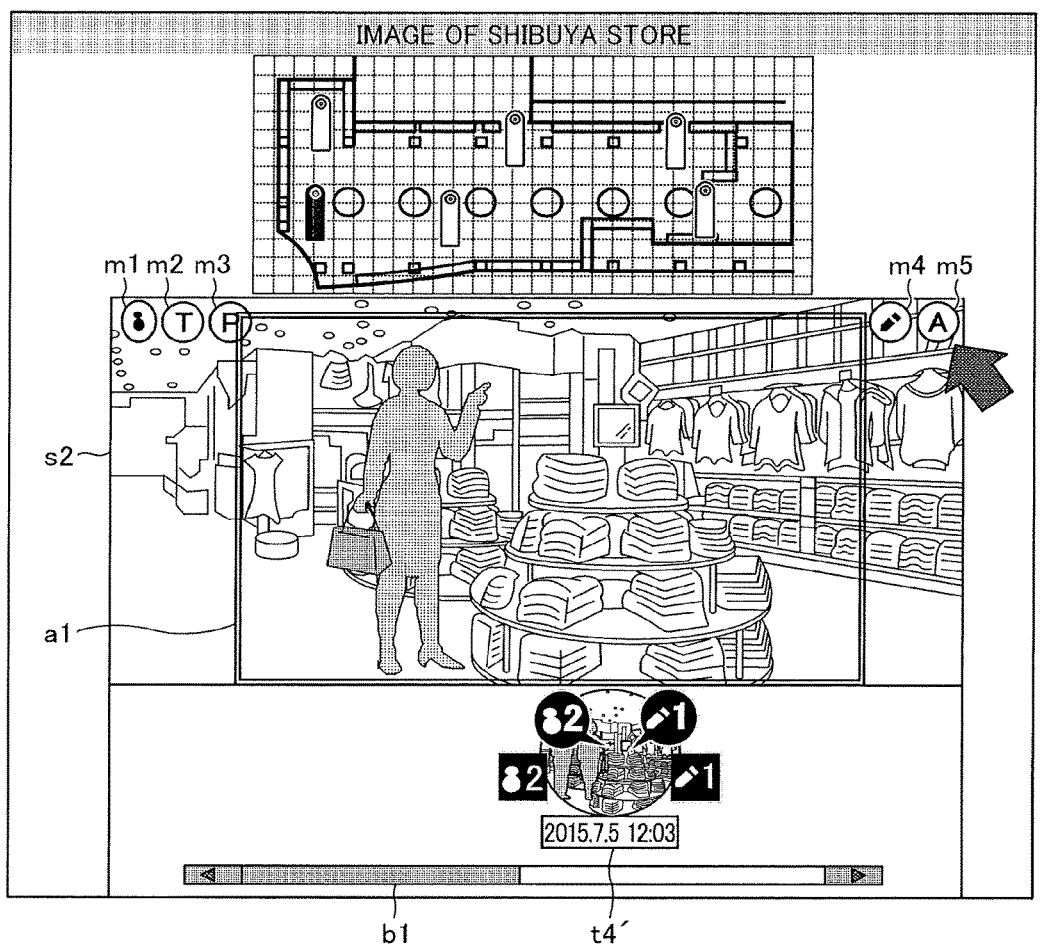
FIG. 39 is a view illustrating an example of the location status screen of a specific location according to an embodiment of the present invention.

Subsequently, assuming that the location status screen as illustrated in FIG. 38 is displayed to the viewer Y, the viewer Y moves a cursor to select the area limitation icon m5 and sets a specific image area frame al as illustrated in FIG. 39 using the keyboard 511 or the mouse 512, for example. In accordance with this user operation, the reception unit 72 of the communication terminal 7 receives an instruction for changing the thumbnail display at S91. In this case, the change request transmitted at S92 is a request for filtering a current thumbnail display to only include a thumbnail or thumbnails, each including at least one person image or at least one drawn-image in the specific image area from among an entire image area corresponding to the captured-image data (full spherical panoramic image data). In this example, the display change data that is stored in response to the user selection of the person display icon m1, the time interval display icon m2, the overlay display icon m3, and the drawn-image display icon m4 is retrieved at S301. Accordingly, at S303, specific thumbnail data is read out based on the change request corresponding to the selection of five icons, that is, the person display icon m1, the time interval display icon m2, the overlay display icon m3, the drawn-image display icon m4, and the area limitation icon m5. It should be noted that, in response to the user selection of the area limitation icon m5, the data storage/read unit 59 searches the "position of person" and the "position of drawn image" from among the related information of the thumbnail management table (see FIG. 18) at S303. Specifically, the data storage/read unit 59 reads out the thumbnail ID associated with the "position of person" or the "position of drawn image" that is included within the specific image area al. Alternatively, the data storage/read unit 59 may read out the thumbnail ID associated with the "position of person" and the "area of person" that are included in the specific image area al. Still alternatively, the data storage/read unit 59 may read out the thumbnail ID associated with the "position of drawn image" and the "area of drawn image" that are included within the specific image area al. Further, at S306, the screen generation unit 54 generates the thumbnail screen data including the specific thumbnails, each being generated based on the captured-image data including the person image and the drawn image in the specific image area al. More specifically, the screen generation unit 54 generates the thumbnail screen data that include square areas described below which respectively indicate the number of detected person images and the number of drawn images.

At S94, the data exchange unit 51 transmits the changed thumbnail screen data generated at S93 (S306) to the communication terminal 7. At S95, as illustrated in FIG. 39, the display control unit 73 of the communication terminal 7 displays a thumbnail t4'. Compared with the thumbnail t4, the thumbnails t4' further includes the number of detected person images ("2" in the square area in an example illustrated in FIG. 39) in the specific image area al and the number of drawn images ("1" in the square area in an example illustrated in FIG. 39) in the specific image area al.

Subsequently, assuming that the location status screen as illustrated in FIG. 39 is displayed to the viewer Y, the viewer Y moves a cursor to select the thumbnail t4', as illustrated in FIG. 40, using the keyboard 511 or the mouse 512, for example. In response to the user selection of the thumbnail t4', the steps from S76 to S82 are performed, and thereby the display control unit 73 displays a specific-area image s3 in the original captured-image data of the thumbnail t4'.

With the operation described heretofore, the viewer Y is able to filter a plurality of thumbnails step-by-step to view the specific-area image s3 in desired captured-image data.

As described heretofore, according to this embodiment, the viewer Y at the communication terminal 7 is able to view a thumbnail including a person image in whichever direction the installer X places the image capturing device 1. This enables the viewer Y to select thumbnails in which a person appears and which have changes.

Further, when the viewer Y select a thumbnail, the specific-area image corresponding to the thumbnail is displayed as illustrated in FIG. 32. This enables the viewer Y to recognize which sales item attracts a customer's attention.

Furthermore, even when a plurality of thumbnails are displayed, the viewer Y as a user is able to filter the thumbnails step-by-step to view the specific-area image s3 in desired captured-image data. This enable to the user to find out the captured-image data on which the user focus attention without difficulty.

Figure 41:
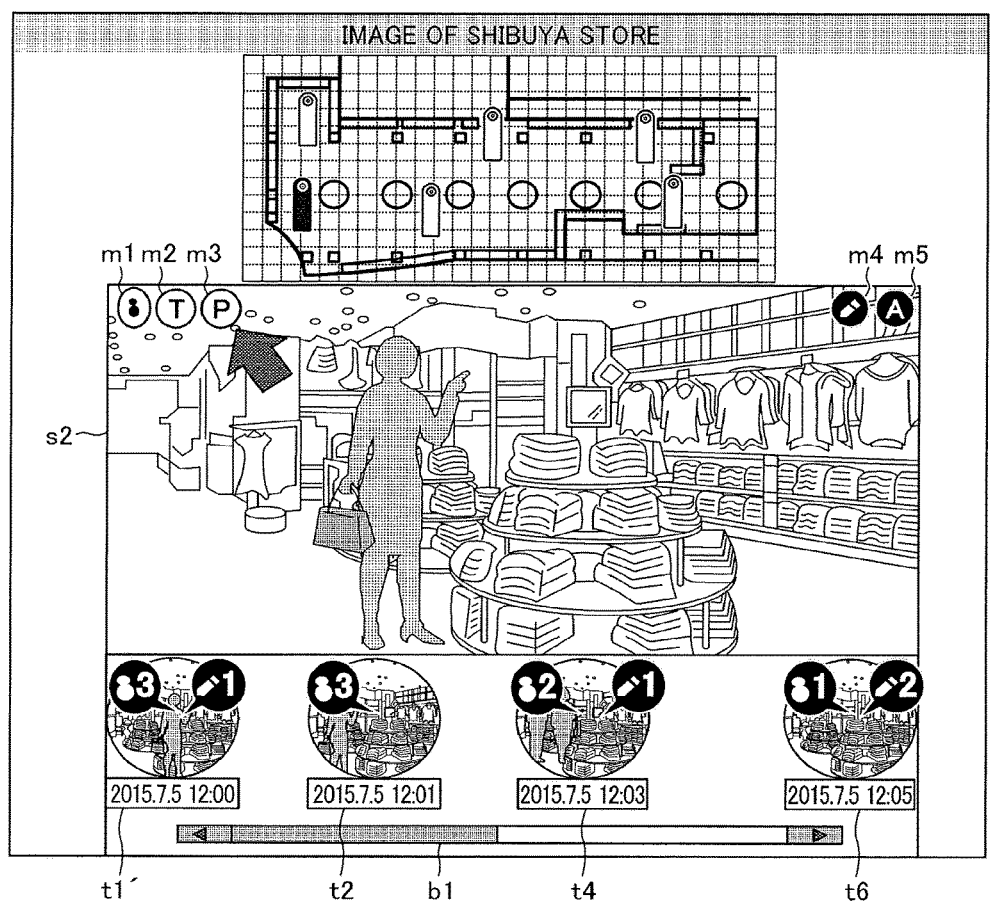
FIG. 41 is a view illustrating a modified example of the location status screen of a specific location according to an embodiment of the present invention.
Figure 42:
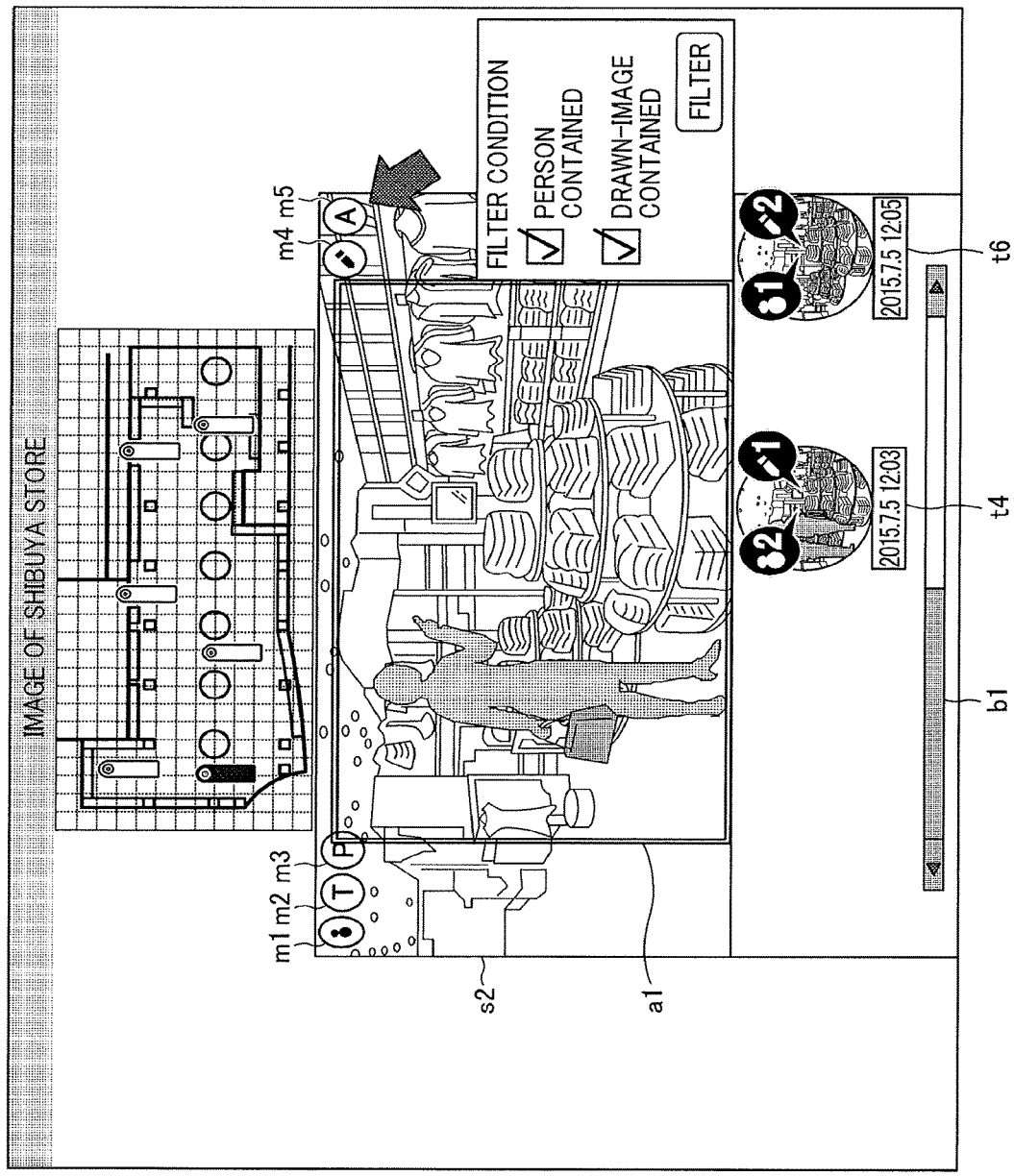
FIG. 42 is a view illustrating a modified example of the location status screen of a specific location according to an embodiment of the present invention.

FIGS. 41 and 42 are views each illustrating a modified example of the location status screen in a specific location.

In FIG. 37, the thumbnails t1 and t2 are displayed as being overlaid with each other, because the original captured-image data from which the thumbnail t1 is generated and the original captured-image data from which the thumbnail t2 is generated include the same person image. However, the display as illustrated in FIG. 37 is just an example. In FIG. 37, the thumbnails t1 and t2 are displayed as being overlaid with each other, because original captured-image data from which the thumbnail t1 is generated and original captured-image data from which the thumbnail t2 is generated include the same person image. However, the display as illustrated in FIG. 37 is just an example. Alternatively, when the original captured-image data include the different numbers of the drawn images from each other, the two thumbnail may be displayed with a space therebetween as a thumbnail t1 and the thumbnail t2 illustrated in FIG. 41.

Furthermore, although, in FIG. 39, in the specific image area al, the thumbnails that have been already filtered are further filtered, this is just an example. Alternatively, as illustrated in FIG. 42, the display control unit 73 may display a pop-up screen including a filtering condition. For example, the pop-up screen includes two check boxes, one check box being for filtering the currently displayed thumbnails to a specific thumbnail(s) generated based on captured-image data including a person image, the other check box being for filtering the currently displayed thumbnails to a specific thumbnail(s) generated based on captured-image data to which a drawn image is attached.

The image management system 5 is implemented by either a single computer or a plurality of computers, each including or performing at least a part of the functional blocks, operations, or memories of the image management system 5 as described above.

A recording medium such as a CD-ROM storing the programs in the above embodiment and the HD 504 storing those programs may be distributed domestically or internationally as a program product.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image management apparatus for controlling a display of a captured image, the apparatus comprising:
   a memory to store a plurality of captured images each of which is captured with an image capturing device; and
   circuitry to:
   generate a thumbnail image from each of the plurality of captured images,
   store, in the memory, for each of the thumbnail images, thumbnail identification information for identifying the thumbnail image in association with related information relating to the captured image, the related information indicating one or more attributes of the captured image,
   transmit one or more thumbnail images of the thumbnail images stored in the memory to a communication terminal to control the communication terminal to display a screen including the one or more thumbnail images,
   receive, from the communication terminal, a change request that requests to change a display of the screen to include one or more specific thumbnail images that meet filter criteria specified in the change request, the one or more specific thumbnail images each being associated with a specific attribute of the related information relating to the plurality of captured images; and
   a transmitter to transmit, to the communication terminal in response to the change request, the one or more specific thumbnail images that meet the filter criteria, the one or more specific thumbnail images each identified by specific thumbnail identification information associated with, in the memory, the specific attribute of the related information relating to the plurality of captured images.

2. The image management apparatus of claim 1, wherein:
   the circuitry is further configured to detect, as a person image, an image of a person included in the captured image;
   the attributes of the related information includes an attribute indicating the number of detected person images;
   the change request requests to change a display of the screen to include the one or more specific thumbnail images each generated from the captured image including one or more person images; and
   the transmitter transmits, to the communication terminal, the one or more specific thumbnail images each identified by the specific thumbnail identification information associated with, in the memory, the attribute indicating that the number of detected person images is one or more.

3. The image management apparatus of claim 2, wherein:
the circuitry is further configured to specify a person based on a feature amount of the person image included in the captured image;
the attributes of the related information includes person identification information for identifying the person;
the change request requests to change a display of the screen such that the one or more specific thumbnail images generated from the captured image including a same person are overlaid with one another; and
the transmitter transmits the one or more specific thumbnail images each identified by the specific thumbnail identification information associated with, in the memory, same person identification information to control the communication terminal to display the one or more specific thumbnail images such that at least a part of each of the one or more specific thumbnail images are overlaid with one another.

4. The image management apparatus of claim 2, wherein:
when the person image detected in the captured image includes a plurality of person images, the circuitry is further configured to specify a position of each of the plurality of person images in the captured image;
the attributes of the related information includes an attribute indicating a position of each of the person images in the captured image;
the change request requests to change a display of the screen to include the one or more specific thumbnail images each including a specific person image indicated by a specific attribute indicating a specific position included in a specific image area in the captured image; and
the transmitter transmits, to the communication terminal, the one or more specific thumbnail images each identified by the specific thumbnail identification information associated with, in the memory, the attribute indicating the position of person image is in the specific image area.

5. The image management apparatus of claim 2, wherein the thumbnail image generated by the circuitry includes an indication of the number of person images detected in the captured image.

6. The image management apparatus of claim 1, wherein:
the circuitry is further configured to receive, from the communication terminal, drawn-image data, which is data of an image drawn to the captured image;
the attributes of the related information includes an attribute indicating the number of drawn images in the captured image;
the change request requests to change a display of the screen to include the one or more specific thumbnail images generated from the captured image including one or more drawn images; and
the transmitter transmits, to the communication terminal, the one or more specific thumbnail images each identified by the specific thumbnail identification information associated with, in the memory, the attribute indicating that the number of drawn images is one or more.

7. The image management apparatus of claim 6, wherein:
when the drawn image includes a plurality of drawn images, the attributes of the related information includes an attribute indicating a position each of the plurality of drawn images in the captured-image data;
the change request requests to change a display of the screen to include the one or more specific thumbnail images each including the drawn-image indicated by an attribute indicating a specific position included in a specific image area in the captured image; and
the transmitter transmits, to the communication terminal, the one or more specific thumbnail images each identified by the specific thumbnail identification information associated with, in the memory, the attribute indicating the position of the drawn image is in the specific image area in the captured image.

8. The image management apparatus of claim 6, wherein the thumbnail image generated by the circuitry includes an indication of the number of drawn images.

9. The image management apparatus of claim 1, wherein:
the attributes of the related information includes an attribute indicating a capturing date and time when the captured-image data is captured;
the change request requests to change a display of the screen such that the thumbnail images are arranged at a distance interval reflecting a time interval of the capturing date and time; and
the transmitter transmits, to the communication terminal, the one or more specific thumbnail images each identified by the specific thumbnail identification information associated with, in the memory, the capturing date and time.

10. The image management apparatus of claim 1, wherein the captured image is full spherical panoramic image.

11. An image communication system comprising:
the image management apparatus of claim 10; and
an image capturing device to capture an image of an object to obtain the full spherical panoramic image.

12. A method for controlling display of captured images, comprising:
generating a thumbnail image from each of a plurality of captured images each of which is captured with an image capturing device;
storing, in a memory, for each of the thumbnail images, thumbnail identification information for identifying the thumbnail image in association with related information relating to the captured image, the related information indicating one or more attributes of the captured image;
transmitting one or more thumbnail images of the thumbnail images stored in the memory to a communication terminal to control the communication terminal to display a screen including the one or more thumbnail images;
receiving, from the communication terminal, a change request that requests to change a display of the screen to include a one or more specific thumbnail images that meet filter criteria specified in the change request, the one or more specific thumbnail images each being associated with a specific attribute of the related information relating to the plurality of captured images; and
transmitting, to the communication terminal in response to the change request, the one or more specific thumbnail images that meet the filter criteria, the one or more specific thumbnail images each identified by specific thumbnail identification information associated with, in the memory, the specific attribute of the related information relating to the plurality of captured images.

13. A non-transitory computer-readable medium storing a computer-executable program that, when executed, causes an image management apparatus to perform a method of controlling display of captured images, the method comprising:

generating a thumbnail image from each of a plurality of captured images each of which is captured with an image capturing device;

storing, in a memory, for each of the thumbnail images, thumbnail identification information for identifying the thumbnail image in association with related information relating to the captured image, the related information indicating one or more attributes of the captured image;

transmitting one or more thumbnail images of the thumbnail images stored in the memory to a communication terminal to control the communication terminal to display a screen including the one or more thumbnail images;

receiving, from the communication terminal, a change request that requests to change a display of the screen to include a one or more specific thumbnail images that meet filter criteria specified in the change request, the one or more specific thumbnail images each being associated with a specific attribute of the related information relating to the plurality of captured images; and transmitting, to the communication terminal in response to the change request, the one or more specific thumbnail images that meet the filter criteria, the one or more specific thumbnail images each identified by specific thumbnail identification information associated with, in the memory, the specific attribute of the related information relating to the plurality of captured images.

* * * * *